(12) United States Patent
Nakajima et al.

(10) Patent No.: US 7,895,394 B2
(45) Date of Patent: Feb. 22, 2011

(54) STORAGE SYSTEM

(75) Inventors: Noriko Nakajima, Machida (JP); Yuichi Taguchi, Sagamihara (JP); Jun Mizuno, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 529 days.

(21) Appl. No.: 11/968,213

(22) Filed: Jan. 2, 2008

(65) Prior Publication Data
US 2008/0201544 A1 Aug. 21, 2008

(30) Foreign Application Priority Data
Feb. 15, 2007 (JP) ............................. 2007-034430

(51) Int. Cl.
*G06F 12/00* (2006.01)
(52) U.S. Cl. .................. 711/114; 711/154; 711/166; 714/2; 709/217
(58) Field of Classification Search .................. 711/114, 711/154, 166; 714/2; 709/217
See application file for complete search history.

(56) References Cited

U.S. PATENT DOCUMENTS

| | | | | |
|---|---|---|---|---|
| 5,394,532 A | * | 2/1995 | Belsan | 711/114 |
| 5,568,635 A | * | 10/1996 | Yamaguchi | 711/171 |
| 6,092,168 A | * | 7/2000 | Voigt | 711/170 |
| 6,925,525 B2 | * | 8/2005 | Blendermann et al. | 711/111 |
| 7,203,814 B2 | * | 4/2007 | Serizawa et al. | 711/202 |
| 7,434,017 B2 | * | 10/2008 | Maruyama et al. | 711/165 |
| 7,613,945 B2 | * | 11/2009 | Soran et al. | 714/5 |
| 2005/0091455 A1 | | 4/2005 | Kano et al. | |
| 2006/0047905 A1 | * | 3/2006 | Matze et al. | 711/114 |
| 2006/0095704 A1 | | 5/2006 | Eguchi et al. | |
| 2006/0282636 A1 | * | 12/2006 | Yamamoto et al. | 711/170 |

FOREIGN PATENT DOCUMENTS

| | | |
|---|---|---|
| JP | 2003-15915 | 1/2003 |
| JP | 2005-209149 | 8/2005 |

* cited by examiner

*Primary Examiner*—Jared I Rutz
*Assistant Examiner*—Matthew Bradley
(74) *Attorney, Agent, or Firm*—Brundidge & Stanger, P.C.

(57) ABSTRACT

A processor of a storage controller receives an erasure process request relating to data stored in a storage unit, from a host computer, via a data I/O interface, detects a logical storage extent which is different to the logical storage extent allocated to the storage unit and which can be allocated, allocates the logical storage extent thus detected to the storage unit, sends a notification indicating that access to the storage unit is possible, to the host computer which is the source of the request, and then executes erasure of the data in the logical storage extent that is associated with the storage unit forming the erasure object, and sends a data erasure notification to the management computer when the data has been erased.

13 Claims, 24 Drawing Sheets

FIG. 5

RAID GROUP CONFIGURATION INFORMATION

| RAID GROUP IDENTIFICATION INFORMATION | STORAGE CAPACITY INFORMATION | STORAGE APPARATUS IDENTIFICATION INFORMATION | | | |
|---|---|---|---|---|---|
| | | #1 | #2 | #3 | #4 |
| RG-01 | 900GB | HD-01 | HD-02 | HD-03 | HD-04 |
| RG-11 | 438GB | HD-11 | HD-12 | HD-13 | HD-14 |
| ... | | ... | ... | ... | ... |

FIG. 6

STORAGE EXTENT CONFIGURATION INFORMATION

| STORAGE EXTENT IDENTIFICATION INFORMATION | RAID GROUP IDENTIFICATION INFORMATION | INITIATION BLOCK ADDRESS | TERMINATION BLOCK ADDRESS | CAPACITY INFORMATION | READ ACCESS PERMISSION INFORMATION | WRITE ACCESS PERMISSION INFORMATION | ERASURE STATUS INFORMATION |
|---|---|---|---|---|---|---|---|
| LD-01 | RG-01 | 0x0001 | 0x0100 | 100GB | READABLE | WRITABLE | NOT ERASED |
| LD-02 | RG-02 | 0x0101 | 0x0200 | 100GB | READABLE | WRITABLE | ERASED |
| LD-03 | RG-02 | 0x0201 | 0x0300 | 100GB | PROHIBITED | WRITABLE | NOT ERASED |
| LD-04 | RG-03 | 0x0101 | 0x0500 | 400GB | READABLE | PROHIBITED | NOT ERASED |
| ... | ... | ... | ... | ... | ... | ... | ... |

FIG. 7

LOGICAL UNIT CONFIGURATION INFORMATION

| NETWORK INTERFACE IDENTIFICATION INFORMATION | STORAGE UNIT IDENTIFICATION INFORMATION | STORAGE EXTENT IDENTIFICATION INFORMATION |
|---|---|---|
| 50:00:01:1E:0A:E8:02 | LU-11 | LD-01 |
| 50:00:01:1E:0A:E8:02 | LU-12 | LD-03 |
| 50:00:01:1E:0A:E8:03 | LU-11 | LD-04 |
| 50:00:01:1E:0A:E8:03 | LU-12 | LD-11 |
| 50:00:01:1E:0A:E8:03 | LU-13 | LD-12 |
| ... | ... | ... |

VIRTUAL STORAGE RESOURCE POOL CONFIGURATION INFORMATION

| VIRTUAL STORAGE RESOURCE POOL IDENTIFICATION INFORMATION | STORAGE EXTENT DENTIFICATION INFORMATION |
|---|---|
| PL-01 | LD-21 |
| PL-01 | LD-22 |
| PL-02 | LD-23 |
| PL-02 | LD-24 |
| PL-02 | LD-25 |
| ... | ... |

VIRTUAL STORAGE UNIT CONFIGURATION INFORMATION

| NETWORK INTERFACE IDENTIFICATION INFORMATION | STORAGE UNIT IDENTIFICATION INFORMATION | VIRTUAL STORAGE RESOURCE POOL IDENTIFICATION INFORMATION | VIRTUAL STORAGE EXTENT IDENTIFICATION INFORMATION |
|---|---|---|---|
| 50:00:01:1E:0A:E8:02 | LU-21 | PL-01 | VD-01 |
| 50:00:01:1E:0A:E8:02 | LU-22 | PL-01 | VD-02 |
| 50:00:01:1E:0A:E8:02 | LU-23 | PL-02 | VD-03 |
| 50:00:01:1E:0A:E8:03 | LU-21 | PL-02 | VD-04 |
| 50:00:01:1E:0A:E8:03 | LU-22 | PL-01 | VD-01 |
| . . . | . . . | . . . | . . . |

FIG. 10

VIRTUAL STORAGE RESOURCE ALLOCATION MAP INFORMATION 1006

| LOGICAL STORAGE EXTENT INFORMATION 10061 | | | VIRTUAL STORAGE EXTENT INFORMATION 10062 | | | ALLOCATION PERMISSION STATUS INFORMATION 10063 |
|---|---|---|---|---|---|---|
| LOGICAL STORAGE EXTENT IDENTIFICATION INFORMATION | INITIATION BLOCK ADDRESS | TERMINATION BLOCK ADDRESS | VIRTUAL STORAGE EXTENT IDENTIFICATION INFORMATION | INITIATION BLOCK ADDRESS | TERMINATION BLOCK ADDRESS | |
| LD-21 | 0x0001 | 0x0010 | VD-02 | 0x0001 | 0x0010 | PERMITTED |
| LD-21 | 0x0011 | 0x0020 | VD-01 | 0x0001 | 0x0010 | PERMITTED |
| LD-21 | 0x0021 | 0x0030 | Null | Null | Null | PERMITTED |
| LD-21 | 0x0031 | 0x0040 | Null | Null | Null | PROHIBITED |
| LD-22 | 0x0001 | 0x0010 | VD-01 | 0x0041 | 0x0050 | PERMITTED |
| ... | ... | ... | ... | ... | ... | ... |

HOST COMPUTER STORAGE EXTENT CONFIGURATION INFORMATION

| STORAGE VOLUME IDENTIFICATION INFORMATION 30011 | STORAGE DEVICE IDENTIFICATION INFORMATION 30012 | NETWORK INTERFACE IDENTIFICATION INFORMATION 30013 | STORAGE UNIT IDENTIFICATION INFORMATION 30014 |
|---|---|---|---|
| /data1 | /dev/sdc1 | 50:00:01:1E:0A:E8:02 | LU-11 |
| /data2 | /dev/sdc2 | 50:00:01:1E:0A:E8:02 | LU-12 |
| . . . | . . . | . . . | . . . |

3001

ERASED STATUS STORAGE EXTENT CREATION PROCESS
STORAGE SUBSYSTEM

FIG. 21

LOGICAL UNIT CONFIGURATION INFORMATION (AFTER PROCESS)

| NETWORK INTERFACE IDENTIFICATION INFORMATION | STORAGE UNIT IDENTIFICATION INFORMATION | STORAGE EXTENT IDENTIFICATION INFORMATION |
|---|---|---|
| 50:00:01:1E:0A:E8:02 | LU-11 | LD-01 |
| 50:00:01:1E:0A:E8:02 | LU-12 | LD-02 |
| 50:00:01:1E:0A:E8:03 | LU-11 | LD-04 |
| 50:00:01:1E:0A:E8:03 | LU-12 | LD-11 |
| 50:00:01:1E:0A:E8:03 | LU-13 | LD-12 |
| ... | ... | ... |

FIG. 22

STORAGE EXTENT CONFIGURATION INFORMATION (AFTER PROCESS)

| 10021 | 10022 | 10023 | 10024 | 10025 | 10026 | 10027 | 10028 |
|---|---|---|---|---|---|---|---|
| STORAGE EXTENT IDENTIFICATION INFORMATION | RAID GROUP IDENTIFICATION INFORMATION | INITIATION BLOCK ADDRESS | TERMINATION BLOCK ADDRESS | CAPACITY INFORMATION | READ ACCESS PERMISSION INFORMATION | WRITE ACCESS PERMISSION INFORMATION | ERASURE STATUS INFORMATION |
| LD-01 | RG-01 | 0x0001 | 0x0100 | 100GB | READABLE | WRITABLE | NOT ERASED |
| LD-02 | RG-02 | 0x0101 | 0x0200 | 100GB | READABLE | WRITABLE | NOT ERASED |
| LD-03 | RG-02 | 0x0201 | 0x0300 | 100GB | READABLE | WRITABLE | ERASED |
| LD-04 | RG-03 | 0x0101 | 0x0500 | 400GB | READABLE | PROHIBITED | NOT ERASED |
| ... | ... | ... | ... | ... | ... | ... | ... |

1002

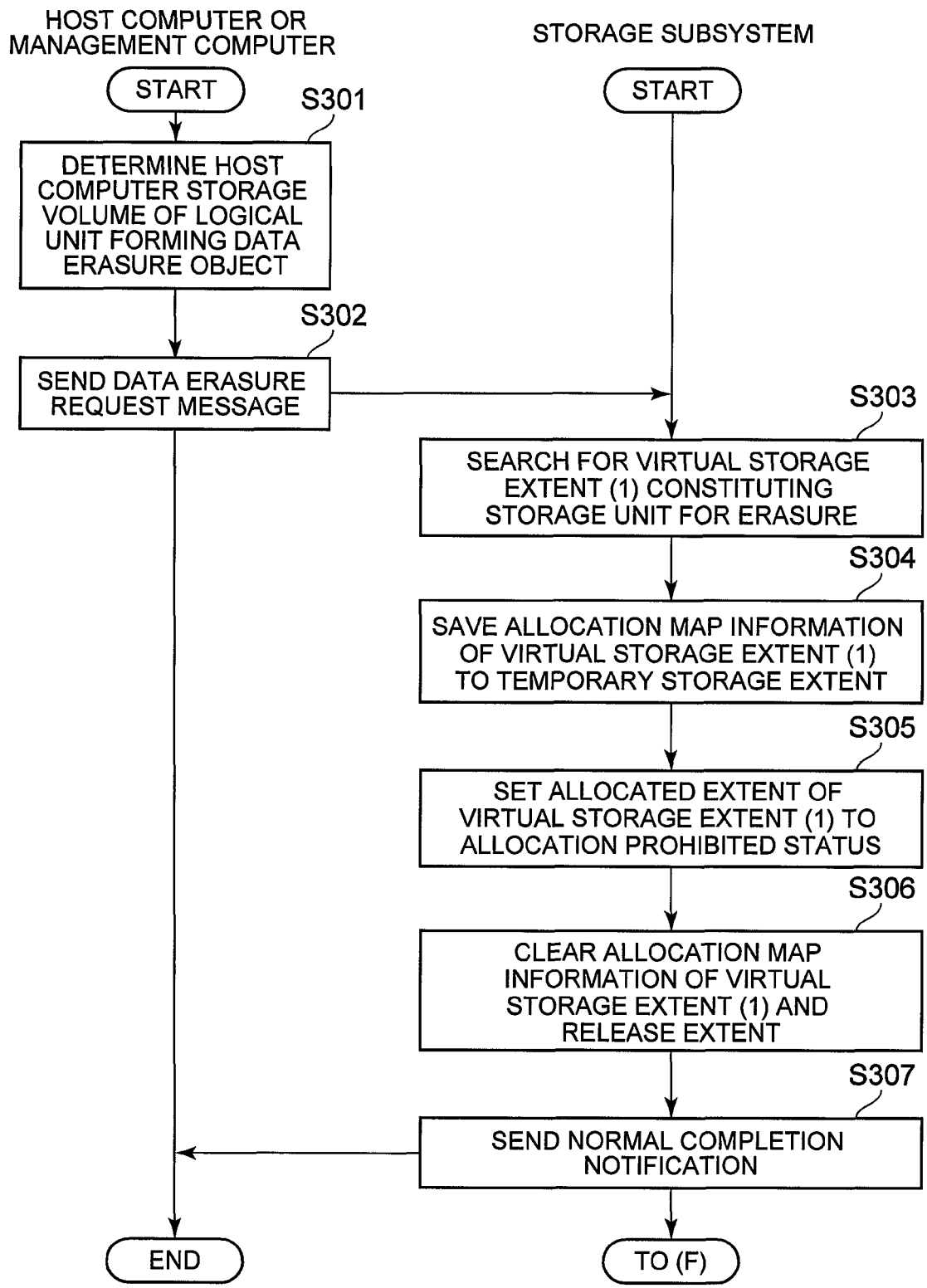

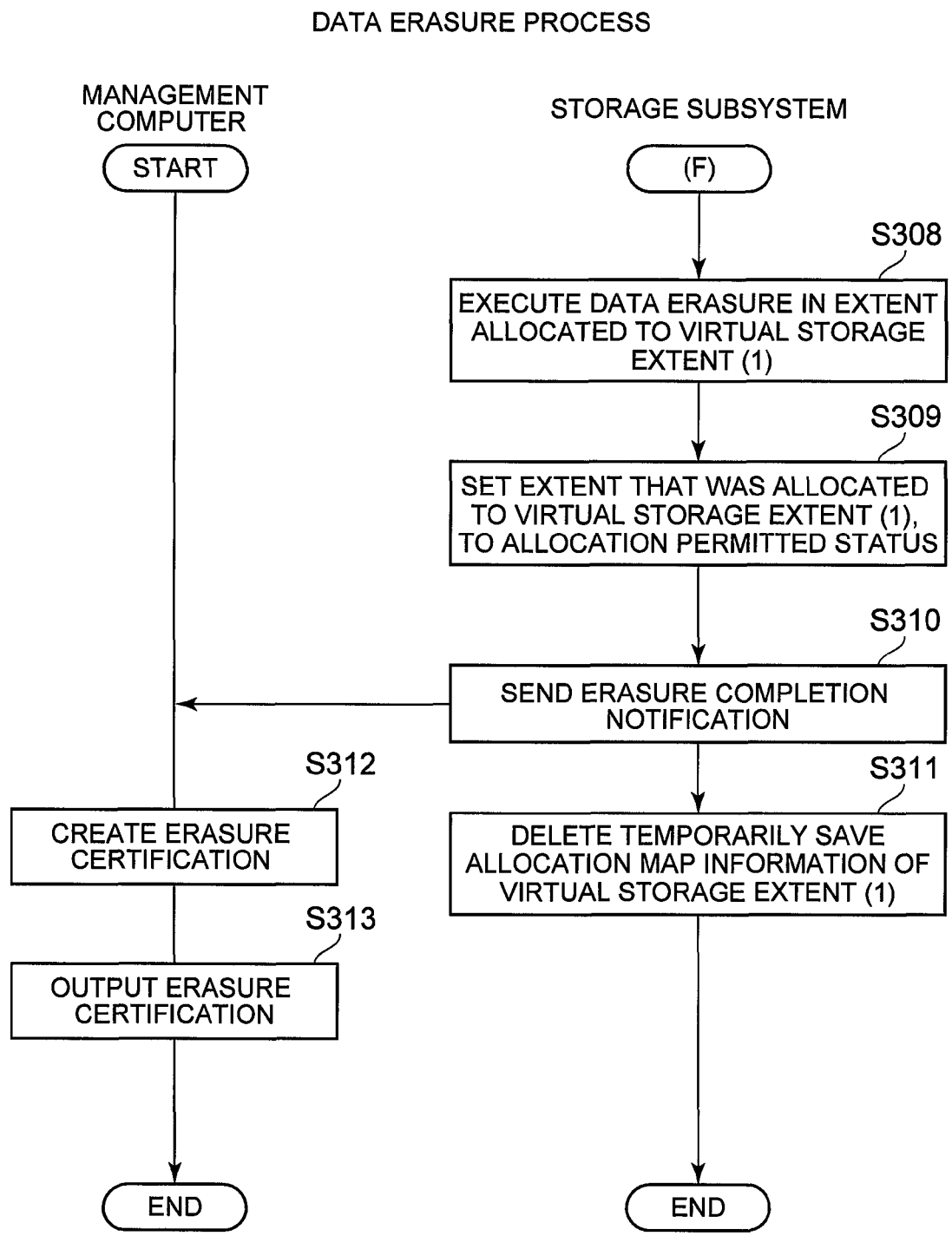

FIG. 25

VIRTUAL STORAGE EXTENT ALLOCATION MAP INFORMATION (AFTER PROCESS)

| LOGICAL STORAGE EXTENT INFORMATION | | | VIRTUAL STORAGE EXTENT INFORMATION | | | ALLOCATION PERMISSION STATUS INFORMATION |
|---|---|---|---|---|---|---|
| LOGICAL STORAGE EXTENT IDENTIFICATION INFORMATION | INITIATION BLOCK ADDRESS | TERMINATION BLOCK ADDRESS | VIRTUAL STORAGE EXTENT IDENTIFICATION INFORMATION | INITIATION BLOCK ADDRESS | TERMINATION BLOCK ADDRESS | |
| LD-21 | 0x0001 | 0x0010 | VD-02 | 0x0001 | 0x0010 | PERMITTED |
| LD-21 | 0x0011 | 0x0020 | Null | Null | Null | PERMITTED |
| LD-21 | 0x0021 | 0x0030 | Null | Null | Null | PERMITTED |
| LD-21 | 0x0031 | 0x0040 | Null | Null | Null | PROHIBITED |
| LD-22 | 0x0001 | 0x0010 | Null | Null | Null | PERMITTED |
| ... | ... | ... | ... | ... | ... | ... |

STORAGE SYSTEM

CROSS-REFERENCE TO PRIOR APPLICATION

This application relates to and claims the benefit of priority from Japanese Patent Application number 2007-34430, filed on Feb. 15, 2007 the entire disclosure of which is incorporated herein by reference.

BACKGROUND

Conventionally, a storage area network (SAN) is known, which is a network that connects one or more computer with one or more external storage apparatus. A SAN is often used in a case where one function is presented by coordinated operation of a plurality of computers, or in a case where one storage apparatus of large capacity is shared by one or more computers. A SAN has advantages in that it allows easy addition, deletion and replacement of storage resources and computer resources, at a later time, and thus has excellent expandability.

In a SAN, a disk array apparatus is generally used as an external storage apparatus. The disk array apparatus is an apparatus which is equipped with a plurality of magnetic disk drives, typically, hard disk devices. In a disk array apparatus, a plurality of magnetic disk drives are managed as a single group, by means of RAID (Redundant Array of Independent Disks) technology, for example. Such a group of magnetic disk drives is called a "RAID group". A RAID group forms one or more logical storage extents. A computer connected to the SAN executes data I/O processing with respect to the logical storage extent(s). When writing data to a logical storage extent, the disk array device stores, for example, one or two redundant data to the magnetic disk drives constituting the RAID group. Storing redundant data in this way is beneficial in that, even if one of the magnetic disk drives suffers a failure, it is still possible to recover the necessary data from the data on the other magnetic disk drives of the RAID group.

On the other hand, volume shredding technology which erases all of the data in a volume is also known. In volume shredding, user data is erased by overwriting meaningless dummy data onto the whole of the volume on which the user data was written. Since this data is overwritten to the storage extent of the whole volume, the process takes a long time, and depending on circumstances, it can take from several hours to several days. For example, the U.S. Department of Defense (DoD) STANDARD, which is one set of standards relating to volume shredding, stipulates that the overwriting of dummy data is to be repeated at least three times or more. According to this volume shredding technology, since it is not possible to recover the data, then unwanted user data can be erased completely, which is advantageous from a security viewpoint.

In general, there are limitations on the number of logical storage extents which can be associated with the ports of a storage system, and hence there are limitations on the number of logical storage extents that can be accessed from a host computer. On the other hand, in dynamic volume allocation technology (see, for example, Japanese Patent Application Publication No. 2005-209149), the logical storage extent associated with a device subject to access from a host computer is changed in accordance with a request from the computer. This technology is advantageous in that, regardless of the number of ports belonging to the storage system, or the number of logical storage extents that can be associated with any one port, access to a plurality of logical storage extents can be permitted and hence the use efficiency of the logical storage apparatus can be improved.

Moreover, in a conventional SAN operation, when mounting a storage volume on the file system running in the host computer, it has been necessary to allocate the physical disk capacity of the corresponding storage volume, statically, in advance. However, in a SAN operation of this kind, expanding capacity or creating or deleting volumes requires a large amount of work, such as system shutdown, and the like. Therefore, a "Thin Provisioning" technique has been developed, in which, rather than allocating a physical disk capacity statically in advance, virtual volumes, namely, volumes in the form of virtual storage extents are presented to the host computer, and a logical storage extent is allocated dynamically from a storage resource pool whenever a write operation from the host computer arises (see, for example, Japanese Patent Application Publication No. 2003-015915). The previously defined storage resource pool may be composed with a relatively small capacity compared to the virtual volume, and in addition to improving the use efficiency of the storage capacity, it is possible to expand the capacity of the storage resource pool without affecting the host computer, and therefore, operation is simplified and the management burden is reduced.

As described above, in a complete erasure (shredding) process relating to a storage apparatus, such as a magnetic disk drive, since dummy data is overwritten to the whole extent of the storage volume, the process may take a very long time, for instance, from several hours to several days. Consequently, a problem arises in that a host computer using a volume that is the object of erasure cannot carry out read or write operations from or to the volume concerned, until the shredding process for that volume has completed, and this produces a very long waiting time.

SUMMARY

The present invention is devised in view of the aforementioned problems, an object thereof being to enable a volume that is the object of erasure to become promptly usable by a host computer, or the like.

In order to achieve the aforementioned objects, the storage system according to one aspect of the present invention is a storage system for managing volumes to which the storage extents of at least a portion of a plurality of storage apparatuses are allocated; comprising: a reception unit which receives an erasure process request relating to data stored in any particular volume; a storage extent detection unit which detects a second storage extent, which is different to the first storage extent allocated to the volume and which can be allocated to the volume; an allocation unit which allocates the second storage extent to the volume, in place of the first storage extent; a notification transmission unit which sends a notification indicating that access to the volume is possible, to the source of the erasure process request, after allocation of the second storage extent; and a first data erasure unit which erases the data in the first storage extent.

BRIEF DESCRIPTION OF THE DRAWINGS

FIG. 5 is a diagram showing one example of the structure of RAID group configuration information according to one embodiment of the present invention;

FIG. 6 is a diagram showing one example of the structure of storage extent configuration information according to one embodiment of the present invention;

FIG. 7 is a diagram showing one example of the structure of logical unit configuration information according to one embodiment of the present invention;

FIG. 8 is a diagram showing one example of the structure of virtual storage resource pool configuration information according to one embodiment of the present invention;

FIG. 9 is a diagram showing one example of the structure of virtual storage unit configuration information according to one embodiment of the present invention;

FIG. 10 is a diagram showing one example of the structure of virtual storage extent allocation map information according to one embodiment of the present invention;

FIG. 11 is a diagram showing one example of the structure of host computer storage extent configuration information according to one embodiment of the present invention;

FIG. 21 is a diagram showing one example of the structure of logical unit configuration information after executing processing according to one embodiment of the present invention;

FIG. 22 is a diagram showing one example of the structure of storage extent configuration information after executing processing according to one embodiment of the present invention;

FIG. 23 is a first flowchart of a data erasure process for a virtual storage unit according to one embodiment of the present invention;

FIG. 24 is a second flowchart of a data erasure process for a virtual storage unit according to one embodiment of the present invention; and FIG. 25 is a diagram showing one example of the structure of virtual storage extent allocation map information after executing processing according to one embodiment of the present invention.

DETAILED DESCRIPTION OF THE PREFERRED EMBODIMENT

Respective embodiments of the present invention are described below with reference to the drawings. The embodiments described below are not intended to limit the scope of the invention described in the claims, and it is not essential that the means of resolving the invention should combine all of the features described in the embodiments.

Figure 1:
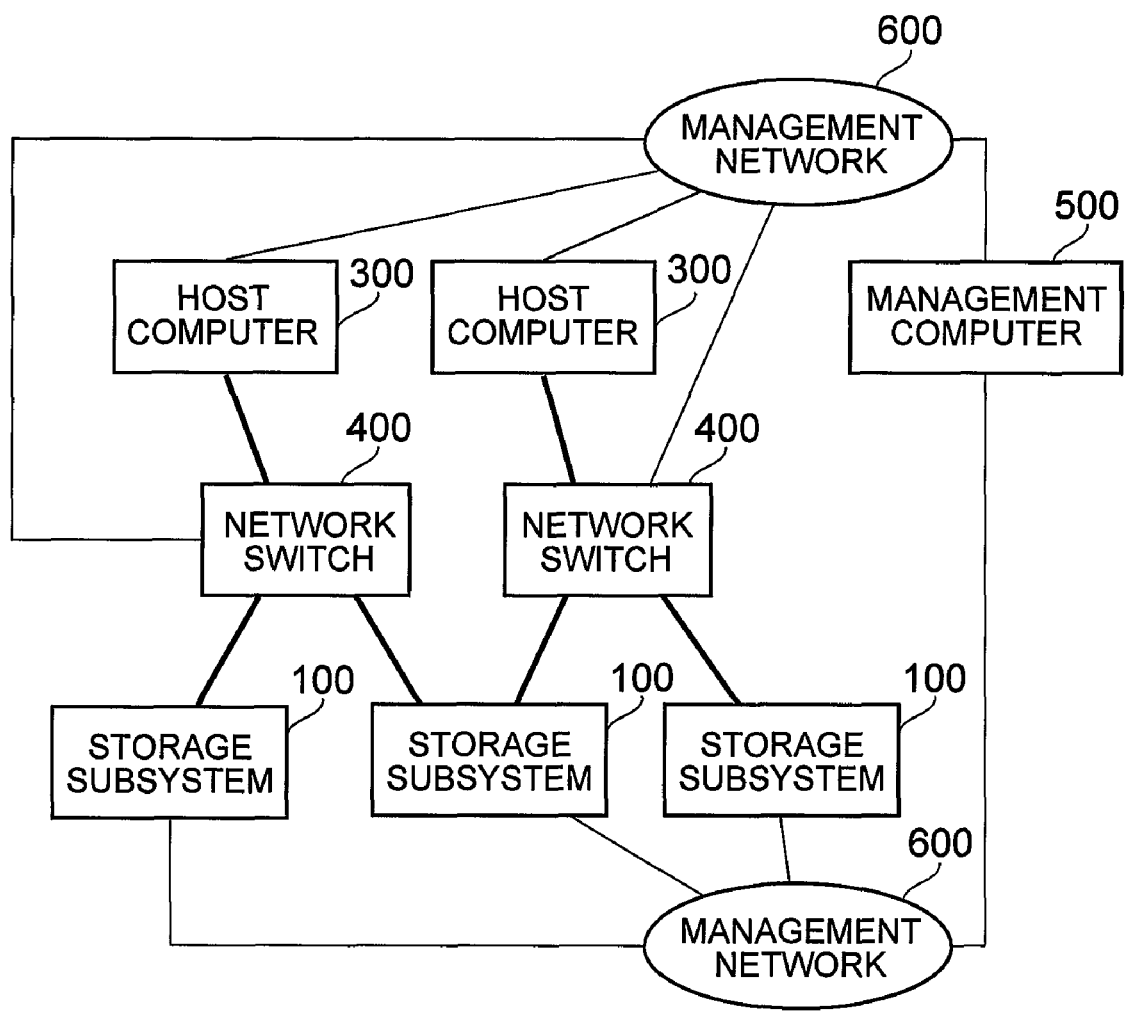
FIG. 1 is a schematic drawing of a computer system according to one embodiment of the present invention.

FIG. 1 is a schematic drawing of a computer system according to one embodiment of the present invention.

In this computer system, host computers 300, which run database and file server applications, and the like, and perform data input/output to and from storage extents, and storage subsystems 100 which comprise hard disk devices, as one example of a storage apparatus, and present storage extents for storing data, are interconnected via network switches 400, in such a manner that data input/output can be performed between the host computers 300 and the storage subsystems 100. The storage subsystems 100, the host computers 300, and the network switches 400 are connected to a management computer 500 via management networks 600. In the present embodiment, the management networks 600 and the data I/O networks constituted by the network switches 400 are composed respectively and independently, but it is also possible to combine the functions of both of these networks into a single network.

Figure 2:
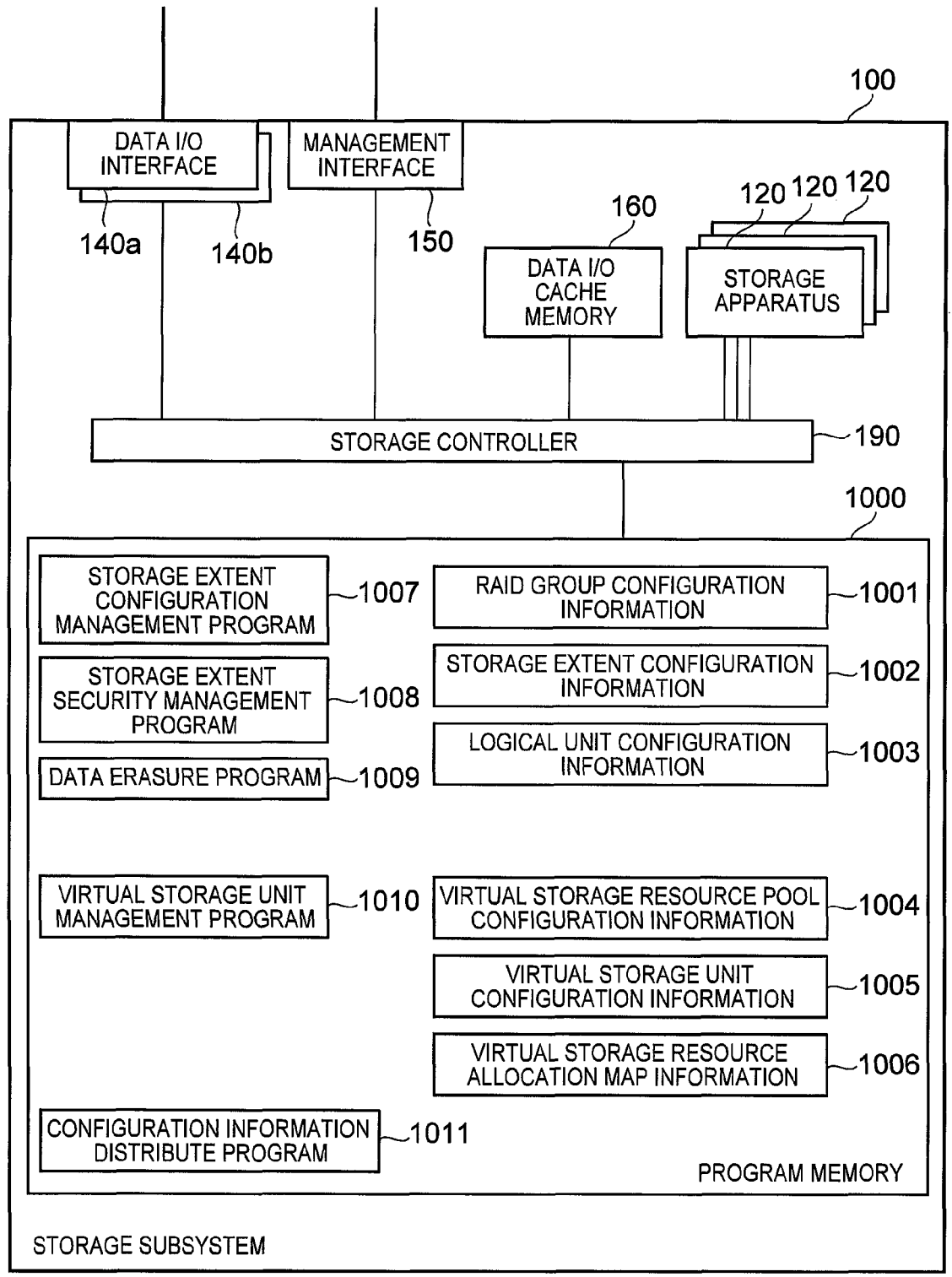
FIG. 2 is a schematic drawing of a storage system according to one embodiment of the present invention.

FIG. 2 is a schematic drawing of the storage subsystem according to one embodiment of the present invention.

The storage subsystem 100 comprises: data I/O interfaces 140 (140a and 140b) for performing data input/output, which are connected to a network switch 400; a management interface 150, connected to a management network 600, for inputting and outputting management information; a storage controller 190 equipped with a processor which governs internal control of the storage subsystem 100; a program memory 1000 forming a storage space for storing programs, information, and the like, which is required to operate the storage subsystem 100; a plurality of storage apparatuses 120; and a data I/O cache memory 160, which is a temporary storage extent for increasing the speed of input/output between the host computer 300 and the storage extent of the storage apparatus 120. The data I/O interfaces 140, the management interface 150, the program memory 1000, the storage apparatuses 120, and the I/O cache memory 160, are connected mutually via the storage controller 190.

The data I/O interfaces 140 and the management interface 150 are respectively realized by network I/O devices, which are used conventionally in fiber channels or Ethernet (registered trademark) connections. There may be one, or more than one, data I/O interface 140 and management interface 150, respectively. Furthermore, in the present embodiment, the data I/O interfaces 140 and the management interface 150 are provided independently, but rather than providing these independently, it is also possible to input and output management information by using the data I/O interfaces 140.

The data I/O cache memory 160 is generally realized by a volatile memory, but it may also be a non-volatile memory, or a hard disk drive (HDD). It is possible to provide one, or more than one, data I/O cache memory 160. Furthermore, the storage capacity of the data I/O cache memory 160 may be any storage capacity. The storage apparatuses 120 are, for example, hard disk drives, which have storage extents for storing data. In the storage subsystem 100 according to the present embodiment, the storage extents of the plurality of storage apparatuses 120 are managed in the following manner. More specifically, in the storage subsystem 100, the plurality of storage apparatuses 120 constitute a RAID, and the storage extents of the plurality of storage apparatuses 120 constituting the RAID are managed as one or more logical storage extent (logical storage extent 11: see FIG. 12), and furthermore, the logical storage extents 11 are managed in association with logical units 10 (logical volumes 10: see FIG. 12). Furthermore, the storage subsystem 100 also manages virtual storage extents (virtual storage extents 15: see FIG. 12), and these virtual storage extents 15 are managed in association with virtual storage units 13 (virtual volumes 13: see FIG. 12). Moreover, in the storage subsystem 100, the virtual storage extents 15 are managed by allocating a logical storage extent 11 to a virtual storage extent 15, as and when necessary.

The program memory 1000 is at least one of an HDD and/or a volatile semiconductor memory, for example, and it comprises a memory space for storing data, and holds basic programs and information required for the operation of the storage subsystem 100. Furthermore, the program memory 1000 also holds the control program and the control information for the storage subsystem 100.

In the present embodiment, the program memory 1000 comprises: RAID group configuration information 1001; storage extent configuration information 1002; logical unit configuration information 1003; virtual storage resource pool configuration information 1004; virtual storage unit configuration information 1005; virtual storage resource allocation map information 1006; a storage extent configuration management program 1007; a storage extent security management program 1008; a data erasure program 1009; a virtual storage unit management program 1010; and a configuration information distribute program 1011. The details of the respective information 1001 to 1006 are described hereinafter.

The storage extent configuration management program 1007 is a program which causes the processor of the storage controller 190 to execute processing for managing the attributes of the storage units (logical volumes) 10 and the logical storage extents 11 corresponding to these storage units 10, as described below, in order to manage the storage extents of the storage apparatuses 120. Furthermore, the storage extent configuration management program 1007 is a program which causes the process of the storage controller 190 to execute control for defining an LU (logical unit) path and allocating a logical storage extent 11 to a storage unit 10, in response to a command from the host computer 300. Moreover, the storage extent configuration management program 1007 is a program which causes the processor of the storage controller 190 to execute an exchanging function (LDEV changer) between a logical storage extent 11 which is the object of erasure in a data erasure process, and a logical storage extent 11 in which data erasure has been completed.

The logical storage extent security management program 1008 is a program which causes the processor of the storage controller 190 to execute processing for restricting access to a logical storage extent 11, for example, in order to prohibit a write operation from an external device, to a logical storage extent 11 which is in the course of an erasure process. The data erasure program 1009 is a program for causing the processor of the storage controller 190 to execute processing for selecting an object for data erasure, in units of one logical storage extent, and completely erasing the data that was originally written to that logical storage extent, by overwriting dummy data to the whole extent of the logical storage extent.

The virtual storage unit management program 1010 is a program which causes the processor of the storage controller 190 to execute processing for managing the allocation of logical storage extents 11 in a virtual storage extent 15, and the configuration of the virtual storage resource pools 14 (see FIG. 12) constituted by the logical storage extents 11. The configuration information distribute program 1011 is a program which causes the processor of the storage controller 190 to execute processing for sending the configuration information of the logical units 10 (logical unit configuration information 1003), to the management computer 500, in order to update the information relating to the logical units 10 in the management computer 500.

Figure 3:
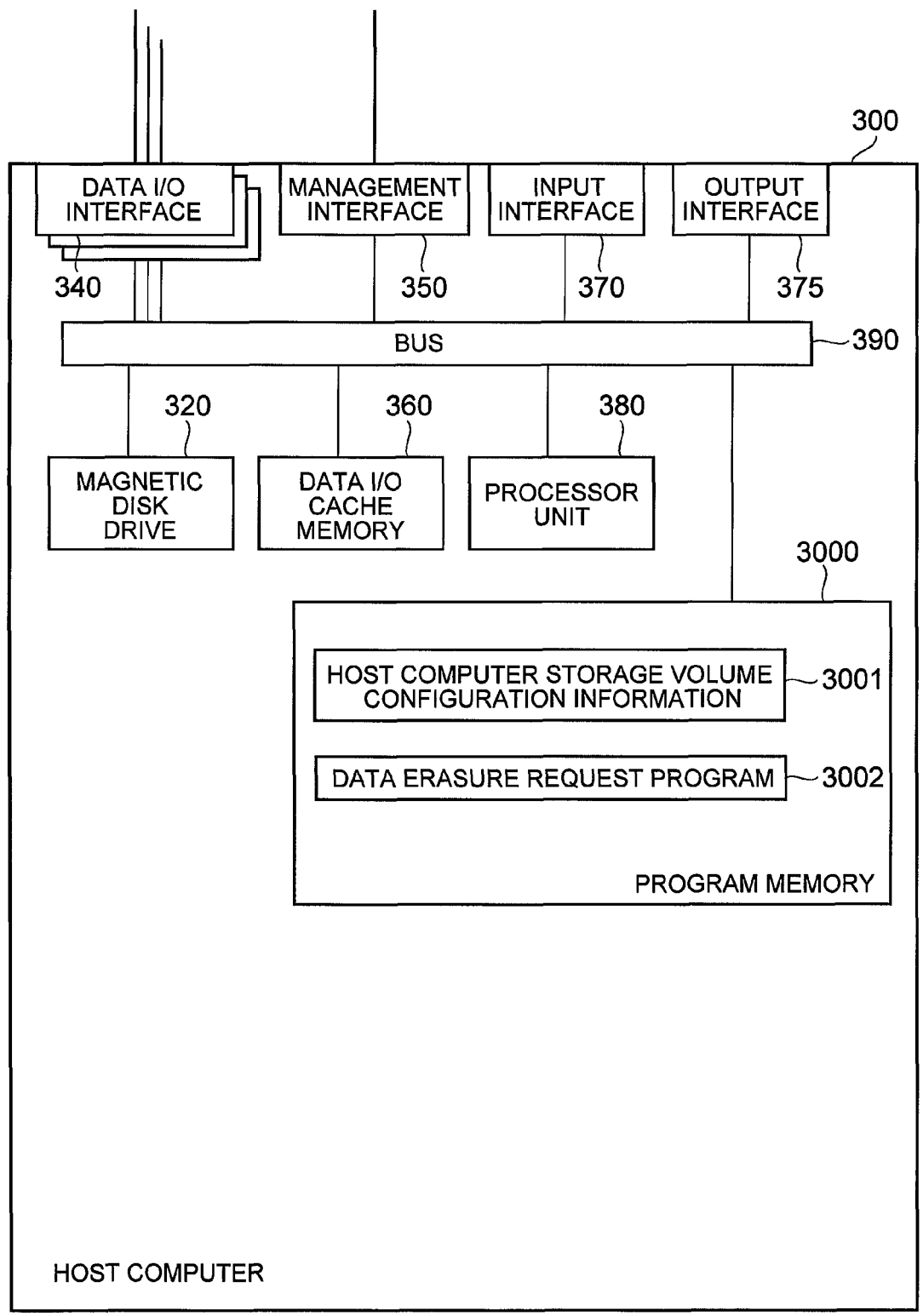
FIG. 3 is a schematic drawing of a host computer according to one embodiment of the present invention.

FIG. 3 is a schematic drawing of a host computer according to one embodiment of the present invention.

The host computer 300 comprises: data I/O interfaces 340, connected to a network switch 400, for data input/output; a management interface 350, connected to a management network 600, for inputting and outputting management information; an input interface 370 whereby an operator can input information, such as a keyboard or a mouse; an output interface 375 for outputting information to an operator, such as a generic display; a processor unit 380, namely, a CPU, for carrying out various calculation processes; a magnetic disk drive 320 for storing basic software, such as an operating system and applications; a program memory 3000 having a storage space for storing programs required for operation of the host computer 300; and a data I/O cache memory 360, constituted by a volatile memory, or the like, for increasing the speed of data I/O operations; these elements of the host computer 300 are mutually interconnected by means of a bus 390. The hardware configuration of the host computer 300 can be realized by means of a generic computer (PC).

The data I/O interface 340 and the management interface 350 are respectively realized by network I/O devices, which are used conventionally in fiber channels or Ethernet connections. There may be one, or more than one, data I/O interface 340 and management interface 350, respectively. Furthermore, in the present embodiment, the data I/O interface 340 and the management interface 350 are provided independently, but rather than providing these independently, it is also possible to input and output management information by using the data I/O interface 340.

The data I/O cache memory 360 is generally realized by a volatile memory, but it may also be a non-volatile memory, or a hard disk drive (HDD). It is possible to provide one, or more than one, data I/O cache memory 360. Furthermore, the storage capacity of the data I/O cache memory 360 may be any storage capacity.

The program memory 3000 is at least one of an HDD and/or a volatile semiconductor memory, for example, and it comprises a memory space for storing data, and holds basic programs and information required for the operation of the host computer 300. Furthermore, the program memory 3000 also holds the control program and the control information for the host computer 300. The program memory 3000 holds host computer storage volume configuration information 3001 and a data erasure request program 3002. The host computer storage volume configuration information 3001 is described hereinafter.

The data erasure request program 3002 is a program which causes the processor unit 380 to execute processing for determining the host computer storage volume 16 (see FIG. 12) that is the object of erasure, and sending a message requesting erasure of data (a data erasure request message), to the data I/O interface 140 and the storage unit 10 in the storage subsystem 100 that is associated with the corresponding host computer storage volume 16.

Figure 4:
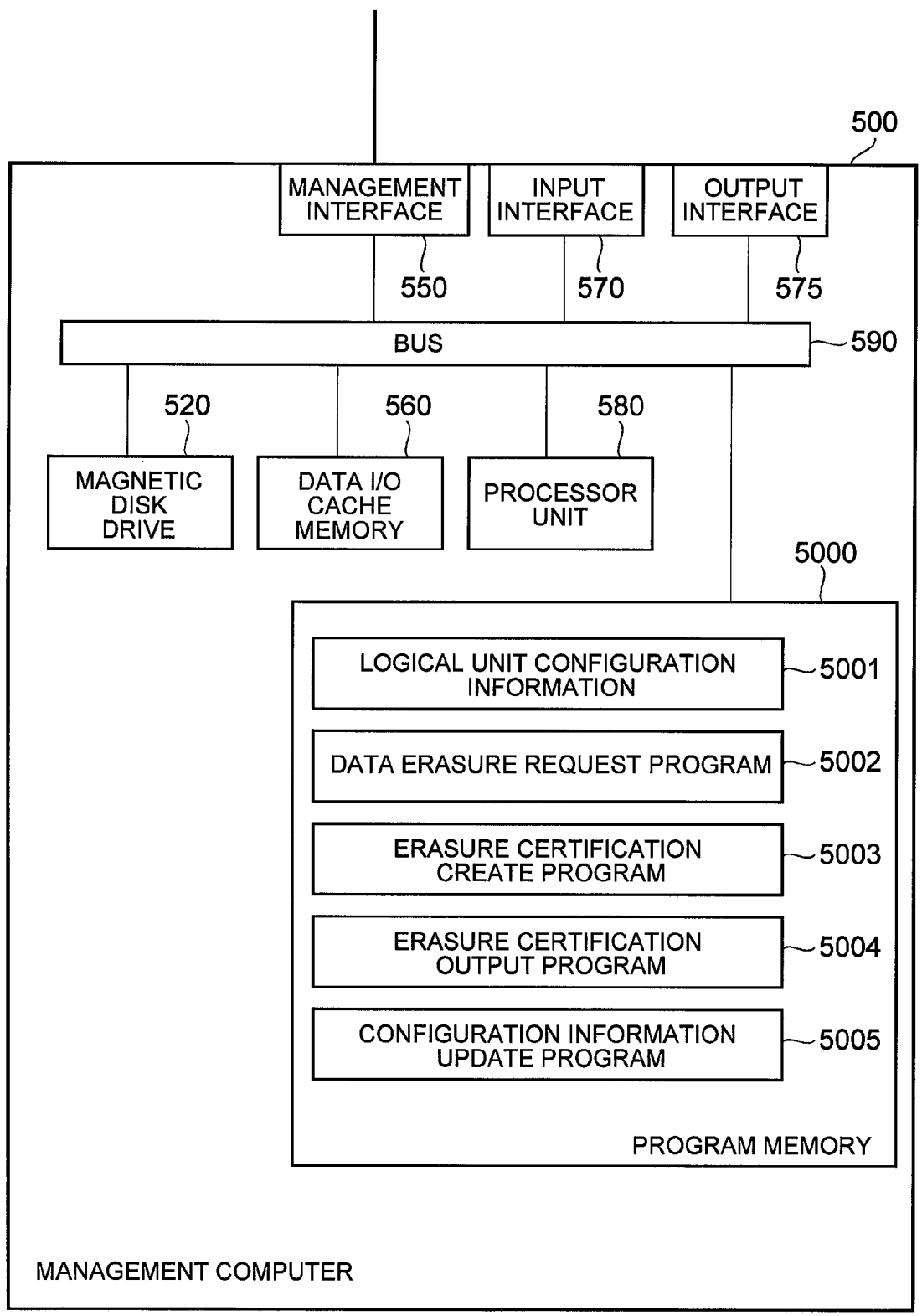
FIG. 4 is a schematic drawing of a management computer according to one embodiment of the present invention.

FIG. 4 is a schematic drawing of a management computer according to one embodiment of the present invention.

The management computer 500 comprises: a management interface 550, connected to a management network 600, for inputting and outputting management information; an input interface 570, such as a keyboard or mouse, whereby an operator can input information; an output interface 575, such as a generic display, for outputting information to an operator; a processor unit 580, namely, a CPU which carries out various calculation processes; a storage apparatus 520 for storing basic software, such as the operating system and applications; and a program memory 5000 having a storage space for storing programs required for the operation of the management computer 500; these elements of the management computer 500 are mutually interconnected via a bus 590. The hardware configuration of the management computer 500 can be realized by means of a generic computer (PC).

The program memory 5000 is at least one of an HDD and/or a volatile semiconductor memory, for example, and it comprises a memory space for storing data, and holds basic programs and information required for the operation of the management computer 500. The program memory 5000 holds: logical unit configuration information 5001, a data erasure request program 5002, an erasure certification create program 5003, an erasure certification output program 5004, and a configuration information update program 5005. The logical unit configuration information 5001 will be described hereinafter.

The data erasure request program 5002 is a program which causes the processor unit 580 to execute processing for determining the storage unit 10, the virtual storage unit 13 or the logical storage extent 11 forming the object of erasure, and sending a request to erase data from the storage unit 10, virtual storage unit 13 or logical storage extent 11 inside the storage subsystem 100. The erasure certification create program 5003 is a program which causes the processor unit 580 to execute processing for creating an erasure certification upon reception of a data erasure completion notification indicating that the data has been erased from the storage subsystem 100. The erasure certification output program 5004 is a program which causes the processor unit 580 to execute processing for outputting the created erasure certification. The configuration information update program 5005 is a program which causes the processor unit 580 to execute processing for updating the logical unit configuration information 5001 on the basis of the logical unit configuration information 1003 received from the storage subsystem 100.

FIG. 5 is a diagram showing one example of the structure of RAID group configuration information according to one embodiment of the present invention.

The RAID group configuration information 1001 comprises, as members, RAID group identification information 10011, storage capacity information 10012, and storage apparatus identification information 10013.

The RAID group identification information 10011 stores identification information which uniquely identifies the respective RAID groups 12 (see FIG. 12) forming the compositional units of the RAID. The storage apparatus identification information 10013 stores identification information that identifies the plurality of storage apparatuses 120 which constitute the RAID group 12 stored as the RAID group identification information 10011. The storage capacity information 10012 stores the storage capacity of the corresponding RAID group 12. The storage capacity value stored in this entry is not the total value of the physical storage capacities of the plurality of storage apparatuses 120 indicated by the identification information stored in the Storage apparatus identification information 10013, but rather, it indicates the effective logical storage capacity to which data can be recorded in the RAID structure. For example, if the RAID has a 3D+1P structure, in other words, a structure where ¼ of the physical storage capacity of the storage apparatuses 120 is used to store parity data, then the effective storage capacity will be the total physical storage capacity minus the physical storage capacity used for parity data, in other words, ¾ of the total value of the physical storage capacity.

FIG. 6 is a diagram showing one example of the structure of storage extent configuration information according to one embodiment of the present invention.

The storage extent configuration information 1002 comprises, as members: storage extent identification information 10021, RAID group identification information 10022, an initiation block address 10023, a termination block address 10024, capacity information 10025, read access permission information 10026, write access permission information 10027, and erasure status information 10028.

The storage extent identification information 10021 stores identification information for identifying a logical storage extent (logical storage extent 11). The RAID group identification information 10022 stores identification information for the RAID group 12 which has the physical storage extent allocated to the corresponding logical storage extent 11.

The initiation block address 10023 stores an initiation block address indicating the initial position of the physical storage extent on the RAID group 12 allocated to the corresponding logical storage extent 11. The termination block address 10024 stores an termination block address indicating the end position of the physical storage extent on the RAID group 12 allocated to the corresponding logical storage extent 11. The physical position of the logical storage extent 11 matches the physical address space indicated by the initiation block address 10023 and the termination block address 10024. The capacity information 10025 stores the storage capacity of the corresponding logical storage extent 11.

The read access permission information 10026 stores a security attribute indicating whether or not the data stored in the corresponding logical storage extent 11 can be read out by an external I/O apparatus, such as a host computer 300. In the present embodiment, the read access permission information 10026 stores the value "Readable" if read access to the data stored in the logical storage extent 11 is permitted from an external I/O device, and it stores the value "Prohibited" if such read access is prohibited. Furthermore, in the present example, the value of the security attribute is stored as a text string, but it is also possible to store a true or false value, such as "0" or "1", to indicate permission or prohibition of access.

The write access permission information 10027 stores a security attribute indicating whether or not an external input device, such as a host computer 300, is permitted to write to the corresponding logical storage extent 11. In the present embodiment, the write access permission information 10027 stores the value "Writable" if write access to the logical storage extent 11 is permitted from an external input device, and it stores the value "Prohibited" if such write access is prohibited. Furthermore, in the present example, the value of the security attribute is stored as a text string, but it is also possible to store a boolean value, such as "0" or "1", to indicate permission or prohibition of access.

The erasure status information 10028 stores information indicating whether or not it is guaranteed that the corresponding logical storage extent 11 has a data erased status. For example, if data erasure processing has been executed for the corresponding logical storage extent 11 in accordance with the data erasure program 1009, and if it is guaranteed that data has not been written from an external I/O apparatus, such as a host computer 300, then the value "Erased" is stored as the attribute. On the other hand, "Not Erased" is stored as an attribute which indicates that the erasure status was not guaranteed at the time that the corresponding logical storage extent 11 was set to a status which allows the possibility of writing from an external I/O device, for instance, when the logical storage extent 11 was registered in a logical unit 10.

FIG. 7 is a diagram showing one example of the structure of logical unit configuration information according to one embodiment of the present invention.

The logical unit configuration information 1003 includes network interface identification information 10031, storage unit identification information 10032, and storage extent identification information 10033. The network interface identification information 10031 stores identification information relating to a data I/O interface 140. The storage unit identification information 10032 stores identification information for a storage unit 10. Here, the storage unit 10 is a unit of storage resources which can be accessed from a host computer 300 connected to the storage subsystem 100 and it corresponds to a volume mounted on the file system being run by the host computer 300. The storage extent identification information 10033 stores identification information for the logical storage extent 11 associated with the corresponding data I/O interface 140 and storage unit 10. The logical unit configuration information 5001 stored in the program memory 5000 of the management computer 500 has the same composition as the logical unit configuration information 1003.

FIG. 8 is a diagram showing one example of the structure of virtual storage resource pool configuration information according to one embodiment of the present invention.

The virtual storage resource pool configuration information 1004 includes virtual storage resource pool identification information 10041 and storage extent identification information 10042. The virtual storage resource pool identification information 10041 stores identification information for a virtual storage resource pool 14 (see FIG. 12), which is constituted by at least a portion of the storage extent of the logical storage extent 11. The storage extent identification information 10042 stores identification information for the logical storage extent 11 which constitutes the corresponding virtual storage resource pool 14.

FIG. 9 is a diagram showing one example of the structure of virtual storage unit configuration information according to one embodiment of the present invention.

The virtual storage unit configuration information 1005 comprises network interface identification information 10051, storage unit identification information 10052, virtual storage resource pool identification information 10053, and virtual storage extent identification information 10054. The network interface identification information 10051 stores identification information relating to a data I/O interface 140. The storage unit identification information 10052 stores identification information for a virtual storage unit (virtual volume) 13. The virtual storage resource pool identification information 10053 stores identification information for the virtual storage resource pool 14 associated with the corresponding data I/O interface 140 and virtual storage unit 13. The virtual storage extent identification information 10054 stores identification information for the virtual storage extent 15 associated with the corresponding data I/O interface 140, virtual storage unit 13 and virtual storage resource pool.

FIG. 10 is a diagram showing one example of the structure of virtual storage extent allocation map information according to one embodiment of the present invention.

The virtual storage extent allocation map information 1006 comprises logical storage extent information 10061, virtual storage extent information 10062 and allocation permission status information 10063. The logical storage extent information 10061 includes logical storage extent identification information 10064, an initiation block address 10065 and a termination block address 10066. The logical storage extent identification information 10064 stores identification information for a logical storage extent 11 which constitutes a virtual storage resource pool 14. The initiation block address 10065 stores an initiation block address for specifying a range of the storage extent within the corresponding logical storage extent 11. The termination block address 10066 stores a termination block address for specifying a range of the storage extent within the corresponding logical storage extent 11. In this logical storage extent information 10061, the storage extent (address space) of the address range represented by the initiation block address and the termination block address can be managed as a unit with respect the logical storage extents 11 constituting a virtual storage resource pool 14. Consequently, the storage extents can be managed by dividing into smaller units than the logical storage extents 11.

The virtual storage extent information 10062 includes virtual storage extent identification information 10067, an initiation block address 10068 and a termination block address 10069. The virtual storage extent identification information 10067 stores identification information for a virtual storage extent 15 to which the storage extent of an address range of the corresponding logical storage extent 11 has been allocated. The initiation block address 10068 stores an initiation block address indicating the initial portion of the virtual address space of the virtual storage extent 15 to which the logical storage extent 11 has been allocated. The termination block address 10069 stores a termination block address indicating the end portion of the virtual address space of the virtual storage extent 15 to which the logical storage extent 11 has been allocated.

The association between the virtual address space of a virtual storage extent 15 and the physical address space of the logical storage extent 11 allocated to that virtual address space is managed on the basis of the information stored in the logical storage extent information 10061 and the information stored in the virtual storage extent information 10062.

The allocation permission status information 10063 stores an attribute value which indicates whether or not the address space of the logical storage extent 11 can be used for allocation of a storage extent to the virtual storage extent 15. In the present embodiment, if the address space of the corresponding logical storage extent 11 can be allocated to the virtual storage extent 15, then the value "Permitted" is stored, and if it cannot be allocated, then the value "Prohibited" is stored.

For example, the uppermost record in the virtual storage extent allocation map information 1006 indicates that the region from block address "0x0011" to "0x0020" of the logical storage extent 11 indicated as "LD-21" has been associated with virtual block address "0x0001" to "0x0010" of the virtual storage extent 15 indicated as "VD-01". When a record of this kind exists, then if there is a data I/O request from the host computer 300 to the storage subsystem 100 with respect to the range from the virtual block address "0x0001" to "0x0010" of virtual storage extent 15 indicated as "VD-01", then this is converted into a data I/O request to the range from block address "0x0011" to "0x0020" of the logical storage extent 11 indicated as "LD-21", and input/output is executed with respect to the logical storage extent 11 indicated as "LD-21".

Furthermore, if there is an input/output request to a region within the virtual address space of the virtual storage extent 15 to which a logical storage extent 11 has not been allocated, then the processor of the storage controller 190 which is executing the virtual storage unit management program 1010 carries out input/output processing by dynamically allocating a region inside the logical storage extent 11, newly, to the virtual address space in question. In this case, the region from the block address "0x0031" to "0x0040" of the logical storage extent 11 indicated by "LD-21" is prohibited for allocation to the virtual storage extent 15, as recorded in the allocation permission status information 10063, and therefore, the processor executing the virtual storage unit management program 1010 does not allocate that region, but rather allocates another region which is permitted for allocation.

FIG. 11 is a diagram showing one example of the structure of host computer storage extent configuration information according to one embodiment of the present invention.

The host computer storage extent configuration information 3001 comprises storage volume identification information 30011, storage device identification information 30012, network interface identification information 30013, and storage unit identification information 30014.

The storage volume identification information 30011 stores identification information indicating a storage volume 16 in the file system run by the host computer 300. The storage device identification information 30012 stores identification information relating to the storage device forming a mount target on which the corresponding storage volume 16 is mounted. The network interface identification information 30013 stores identification information for a data I/O interface 140 of the storage subsystem 100 to which the host computer 300 connects in order to access the corresponding storage volume 16. The storage unit identification information 30014 stores information indicating the storage unit 10 corresponding to the storage volume 16. In the host computer 300, this host computer storage extent configuration information 3001 is used to carry out I/O requests to the storage volumes 16. In other words, an I/O request to a storage volume 16 is executed with respect to a storage unit 10 set by the data I/O interface 140 of the storage subsystem 100 with which the host computer 300 is able to communicate via the network switch 400.

Figure 12:
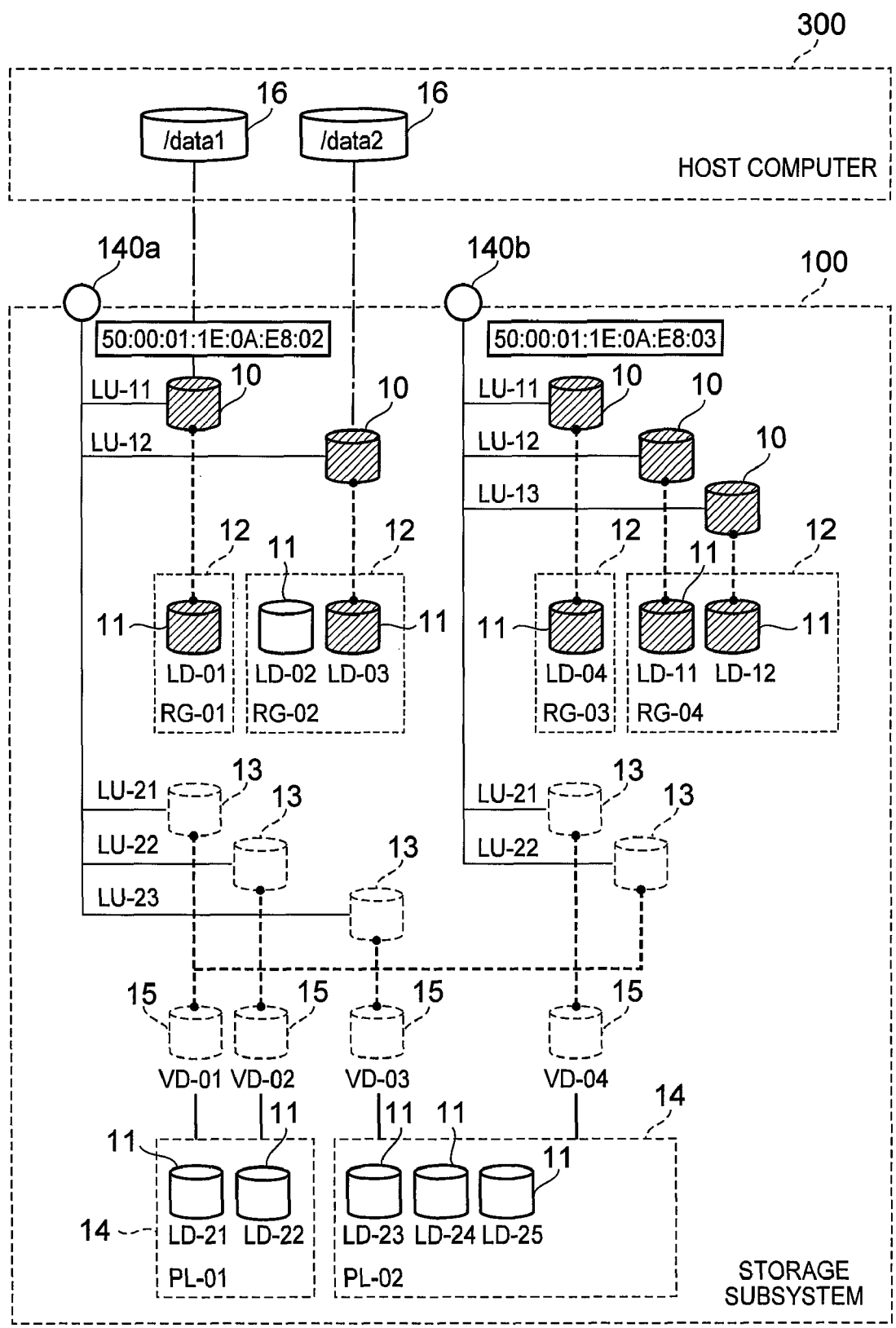
FIG. 12 is a diagram showing one example of the logical structure of a storage system and a host computer according to one embodiment of the present invention.

FIG. 12 is a diagram showing one example of the logical structure of a storage subsystem and a host computer according to one embodiment of the present invention. FIG. 12 shows the structure in a case where the contents indicated in FIG. 5 to FIG. 11 are stored as the respective information elements shown in the respective drawings.

The storage subsystem 100 accommodates RAID groups 12, as "RG-01", "RG-02", "RG-03", "RG-04", etc. (see RAID group configuration information 1001 in FIG. 5). Logical storage extents 11 are defined within the RAID groups 12. For example, in the RAID group 12 identified as "RG-02", the logical storage extents 11 identified as "LD-02" and "LD-03" are defined (see storage extent configuration information 1002 in FIG. 6). The logical storage extent 11 "LD-02" is in a state where erasure is guaranteed by the data erasure program 1009 (see storage extent configuration information 1002 in FIG. 6).

Storage units 10 are associated with the logical storage extents 11 (see logical unit configuration information 1003 in FIG. 7). For example, the logical unit 10 indicated as "LU-12" at the data I/O interface 140a indicated as "50:00:01:1E:0A: E8:02" is associated with the logical storage extent 11 indicated as "LD-03" (see the logical unit configuration information 1003 in FIG. 7). On the other hand, the logical units 10 are also associated with host computer storage volumes 16 on the host computer 300 (see the host computer storage extent configuration information 3001 in FIG. 11). For example, the storage unit 10 indicated as "LU-12" at the data I/O interface 140a indicated as "50:00:01:1E:0A:E8:02" is associated with the host computer storage volume 16 indicated as "/data2" (see the host computer storage extent configuration information 3001 in FIG. 11).

Furthermore, virtual storage resource pools 14 are constituted by groups of logical storage extents 11 (see the virtual storage resource pool configuration information 1004 in FIG. 8). For example, the virtual storage resource pool 14 indicated as "PL-01" is constituted by the logical storage extents 11 indicated as "LD-21" and "LD-22" (see the virtual storage resource pool configuration information 1004 in FIG. 8).

Virtual storage extents 15 are defined in the virtual storage resource pools 14 (see the virtual storage unit configuration information 1005 in FIG. 9). For example, the virtual storage extents 15 indicated as "VD-01" and "VD-02" are defined in the virtual storage resource pool 14 indicated as "PL-01" (see the virtual storage unit configuration information 1005 in FIG. 9). The virtual storage extents 15 are associated with the virtual storage units 13 (see the virtual storage unit configuration information 1005 in FIG. 9). For example, the virtual storage extent 15 indicated as "VD-01" is associated with the virtual storage unit 13 indicated as "LU-21" at the data I/O interface 140a indicated as "50:00:01:1E:0A:E8:02" (see the virtual storage unit configuration information 1005 in FIG. 9). Moreover, the virtual address space of the virtual storage extent 15 indicated as "VD-01" and the address space of the logical storage extent 11 indicated as "LD-21" are mutually associated by means of the virtual storage extent allocation map information 1006 shown in FIG. 10.

Next, a logical unit configuration information update process, which is executed between the management computer 500 and the storage subsystem 100, will be described.

Figure 13:
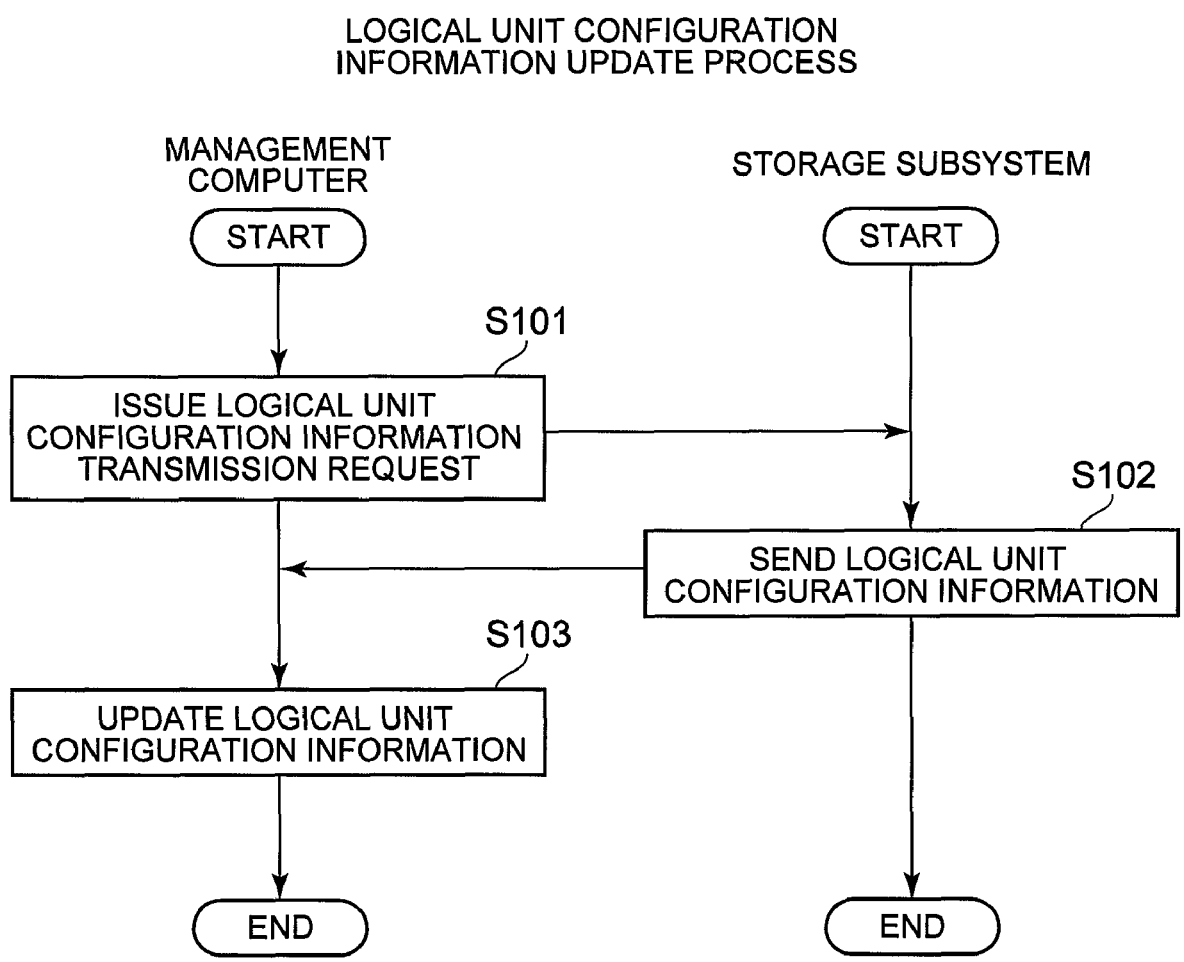
FIG. 13 is a flowchart of a logical unit configuration information update process according to one embodiment of the present invention.

FIG. 13 is a flowchart of a logical unit configuration information update process according to one embodiment of the present invention.

The logical unit configuration information update process is executed at prescribed time intervals, for example, and the processing on the management computer 500 side is carried out by means of the processor unit 580 executing the configuration information update program 5005.

The processor unit 580 of the management computer 500 issues a transmission request message for logical unit configuration information, to the storage subsystem 100, by means of the management interface 550 (step s101). In the storage subsystem 100, the processor of the storage controller 190 receives the transmission request message for logical unit configuration information, via the management interface 150, and sends logical unit configuration information 1003 to the management computer 500, via the management interface 150, by means of the processor executing the configuration information distribute program 1011 (step s102).

Upon receiving this logical unit configuration information 1003, the management computer 500 updates the logical unit configuration information 5001 held in the program memory 5000, on the basis of the logical unit configuration information 1003 received by the processor unit 580 (step s103). By means of this processing, the management computer 500 is able to progressively update the logical unit configuration information 5001, to reflect the most recent state in the storage subsystem 100.

Next, an erased status storage extent creation process in the storage subsystem 100 will be described.

Figure 14:
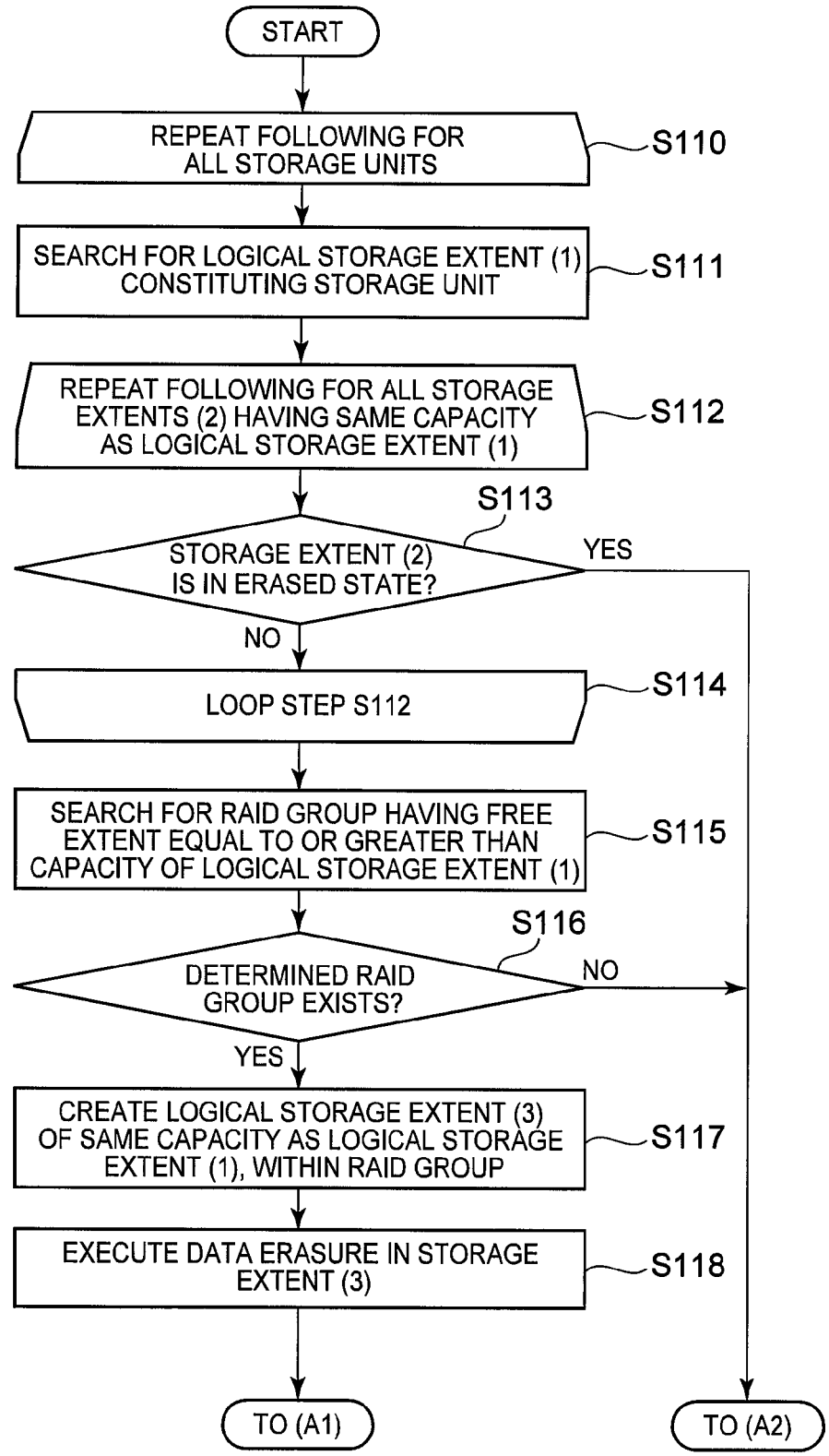
FIG. 14 is a first flowchart of an erased status storage extent creation process according to one embodiment of the present invention.
Figure 15:
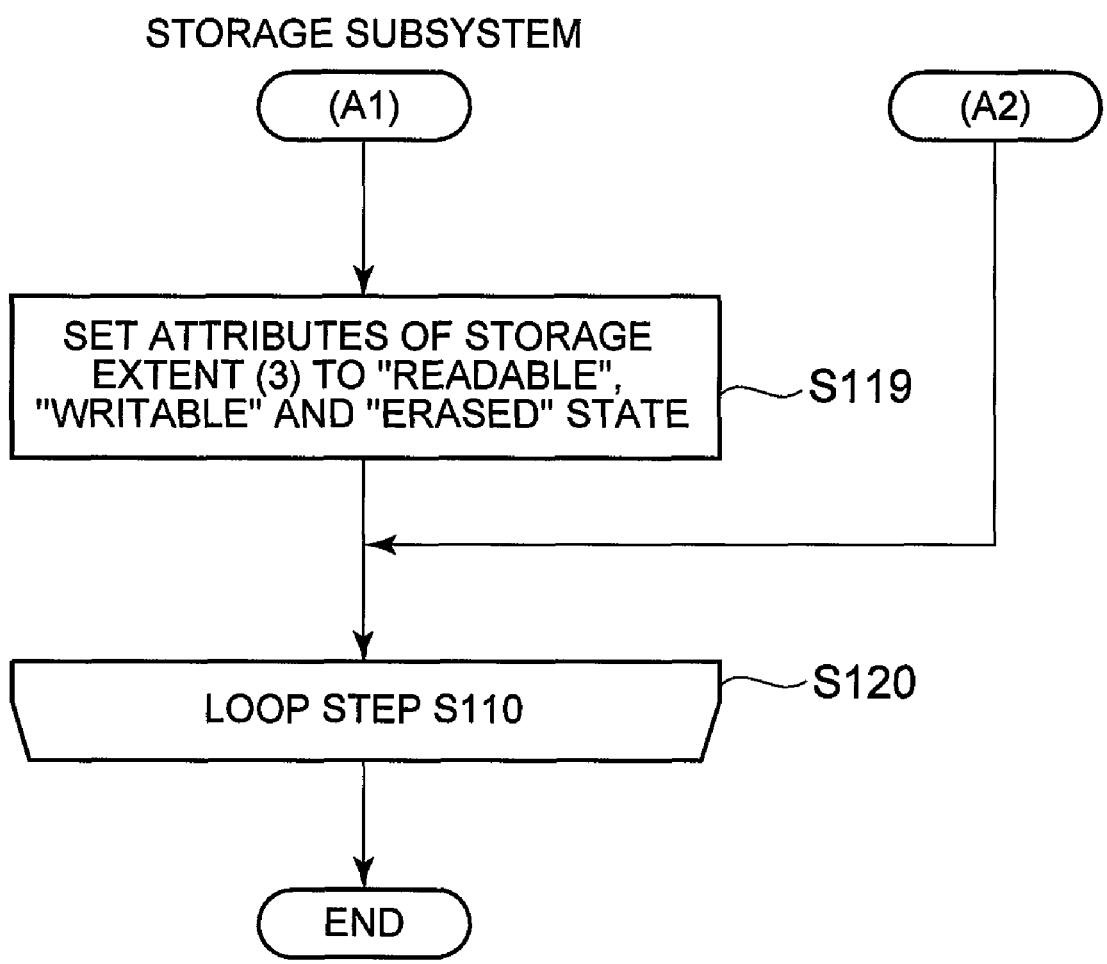
FIG. 15 is a second flowchart of an erased status storage extent creation process according to one embodiment of the present invention.
Figure 16:
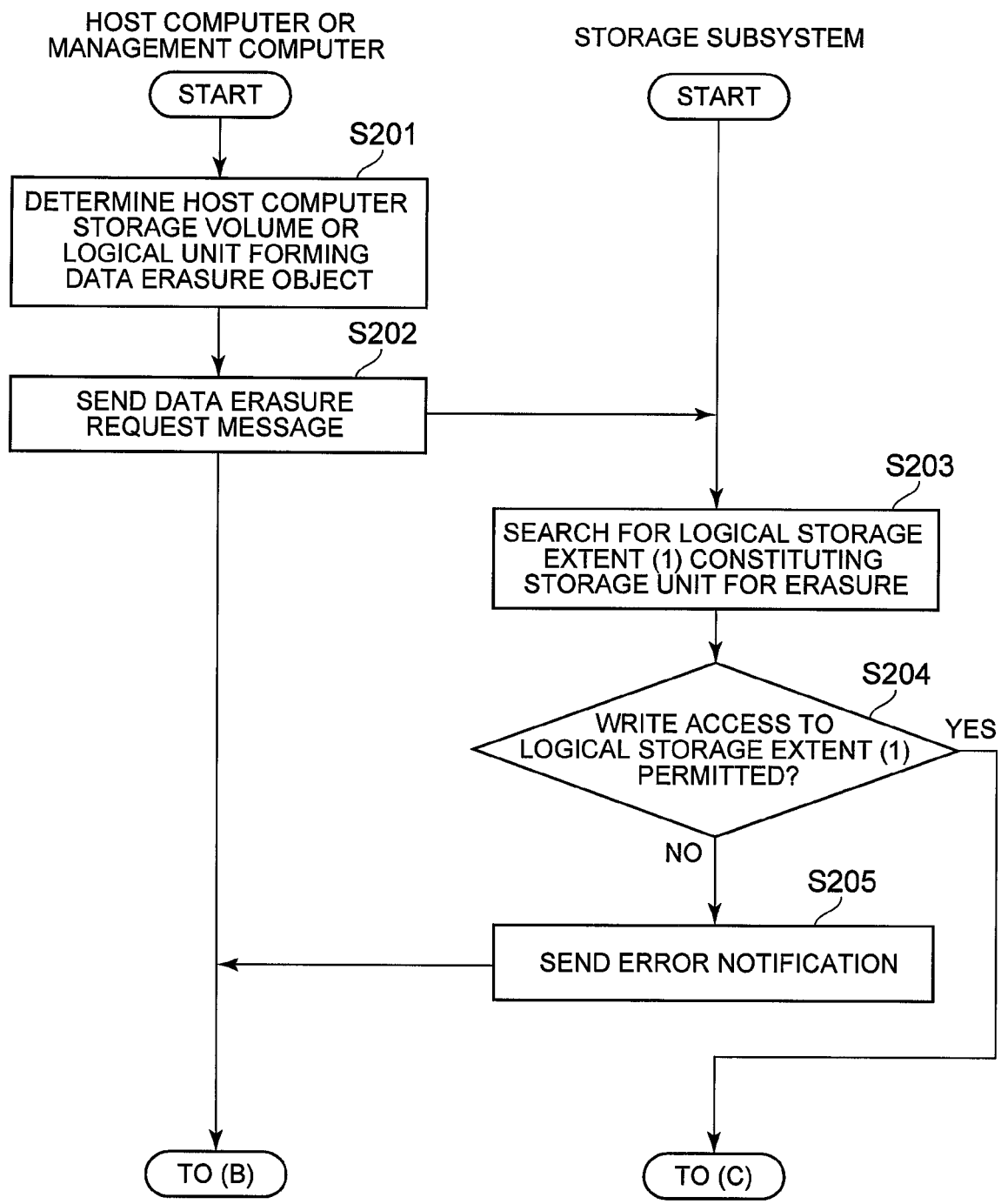
FIG. 16 is a first flowchart of a data erasure process according to one embodiment of the present invention.
Figure 17:
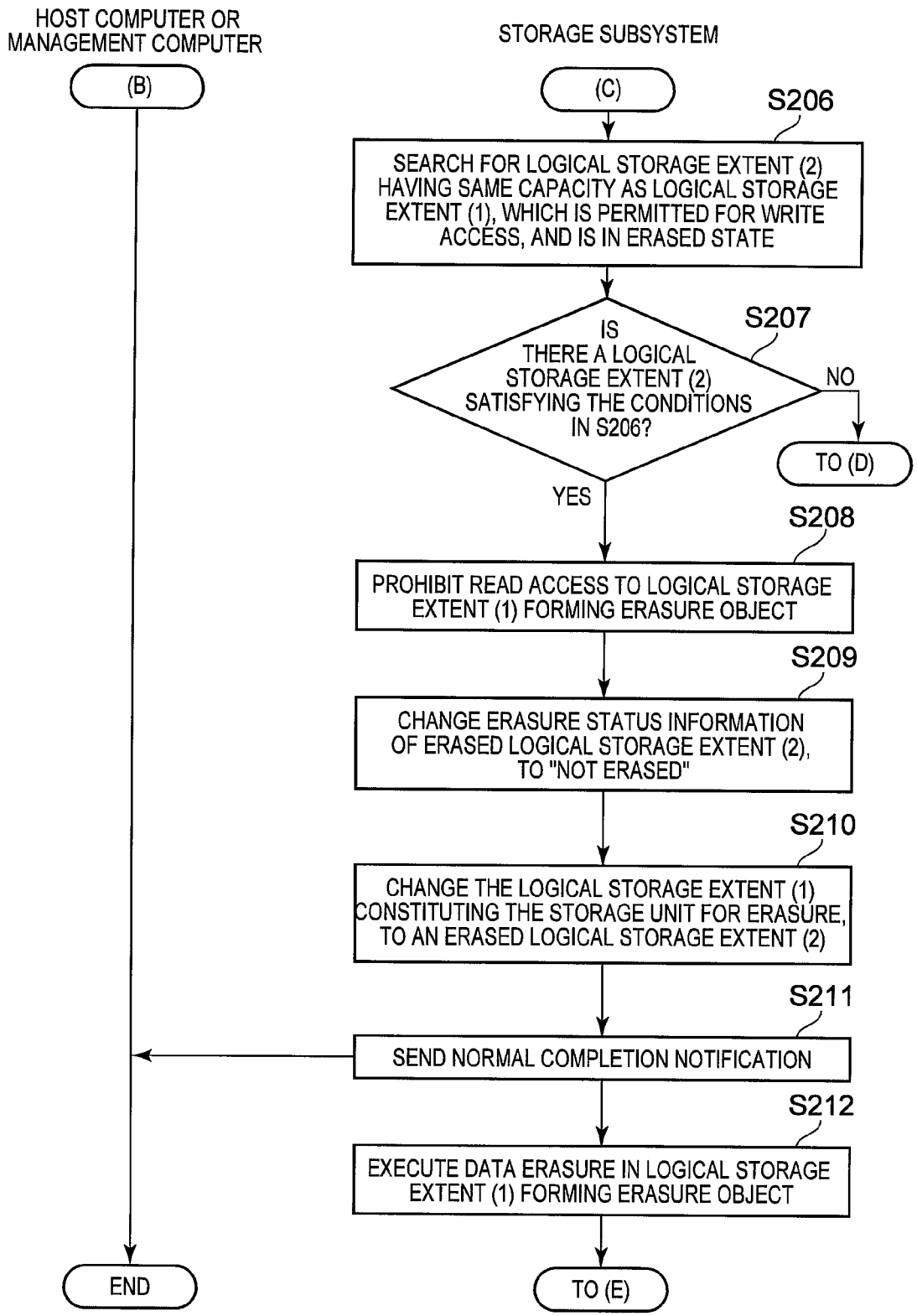
FIG. 17 is a second flowchart of a data erasure process according to one embodiment of the present invention.
Figure 18:
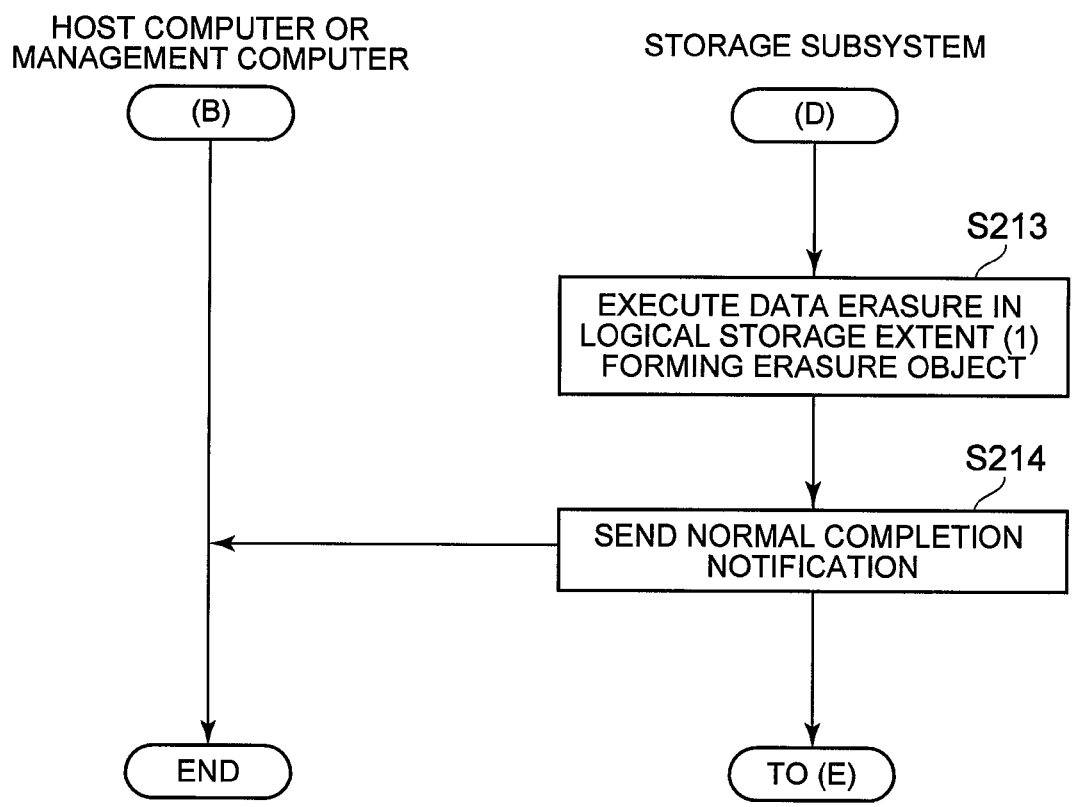
FIG. 18 is a third flowchart of a data erasure process according to one embodiment of the present invention.
Figure 19:
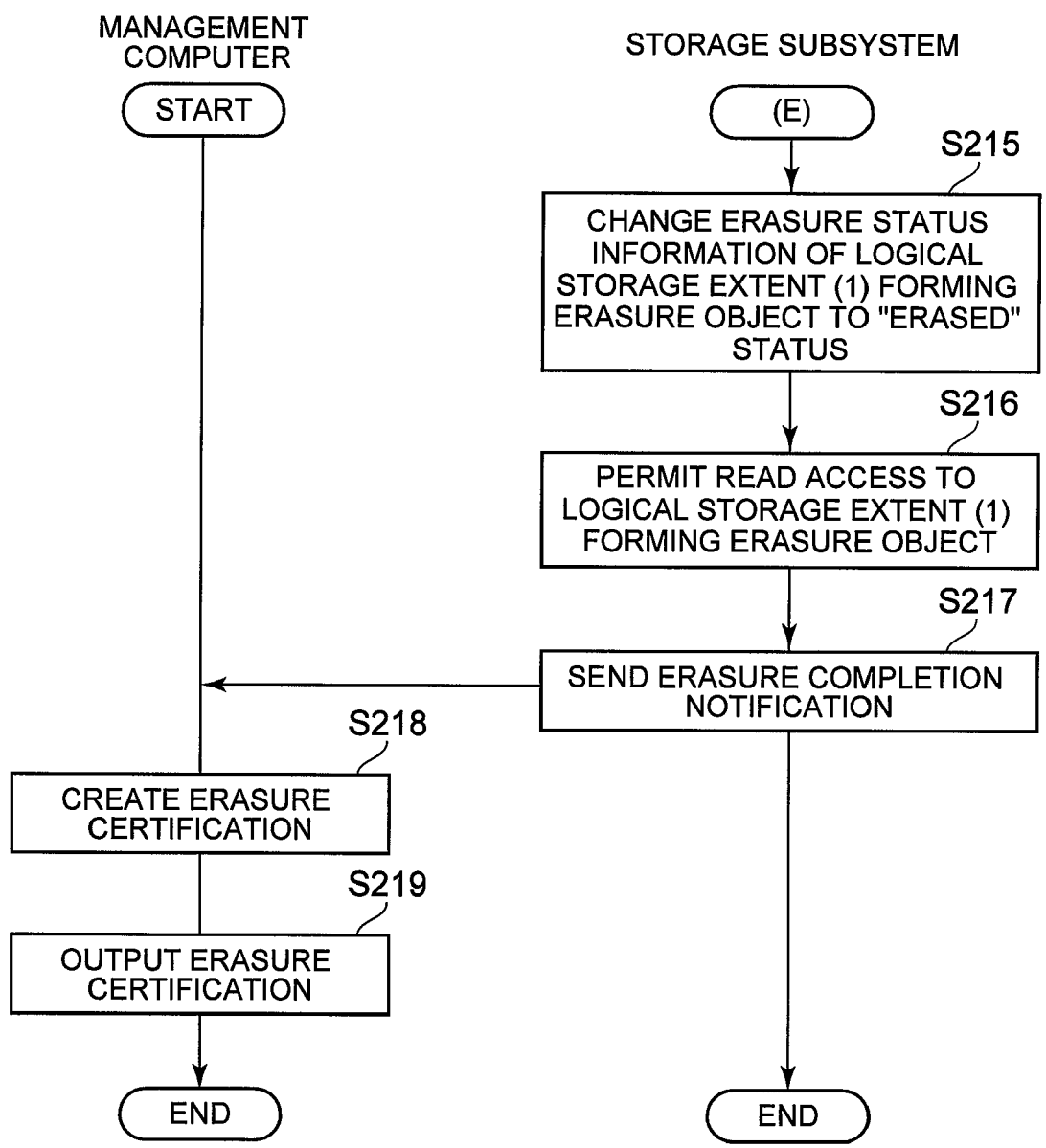
FIG. 19 is a fourth flowchart of a data erasure process according to one embodiment of the present invention.

FIG. 14 and FIG. 15 are flowcharts of an erased status storage extent creation process according to one embodiment of the present invention.

In the storage subsystem 100, for example, the erased status storage extent creation process is executed by means of the process of the storage controller 190 executing the storage extent configuration management program 1007, at prescribed time intervals.

In the erased status storage extent creation process, firstly, the processor of the storage controller 190 of the storage subsystem 100 starts to execute steps s110 to s120, repeatedly, for each of the respective storage units 10 stored in the logical unit configuration information 1003 (step s110). The processor of the storage controller 190 searches the logical unit configuration information 1003 and acquires the logical storage extents 11 constituting a storage unit 10 that is not being processed (step sill). Below, a logical storage extent 11 acquired at step sill in the erased status storage extent creation process is described as a logical storage extent (1), for descriptive purposes.

The processor of the storage controller 190 searches for logical storage extents 11 having the same capacity as the logical storage extent (1), amongst all of the logical storage extents 11 stored in the storage extent configuration information 1002, by referring to the capacity information 10025, and it starts to execute step s113 repeatedly, for each of the logical storage extents 11 obtained by this search (step s112). Below, a logical storage extent 11 acquired at step s112 in the erased status storage extent creation process is described as a logical storage extent (2), for descriptive purposes.

The processor of the storage controller 190 refers to the erasure status information 10028 corresponding to the logical storage extent (2) in the storage extent configuration information 1002, and thus determines whether or not the logical storage extent (2) is in an erased state (step s113). If the logical storage extent (2) is in an erased state (Yes at step s113), then the processor of the storage controller 190 transits to step s119 and repeats the same processing for another storage unit 10. On the other hand, if the logical storage extent (2) is not in an erased state (No at step s113), then the processor of the storage controller 190 transits to step s114 and repeats the steps from step s113 for another logical storage extent (2).

If, as a result of judging the erased status of all of the logical storage extents (2), it is not possible to find a logical storage extent 11 which is in an erased state, then processor exits from the loop of step s112 and transits to step s115.

At step s115, the processor in storage controller 190 searches the RAID group configuration information 1001 and the storage extent configuration information 1002 to find a RAID group 12 having a free extent which is equal to or greater than the capacity of the logical storage extent (1) (step s115). Here, the free extent of a RAID group 12 can be calculated by acquiring all of the entries (records) in the storage extent configuration information 1002 which have RAID group identification information 10022 matching the RAID group 12 under investigation, calculating the total value of the capacities recorded in the capacity information 10025 of the respective entries, and then subtracting this total capacity value from the storage capacity information 10012 of the entry in the RAID group configuration information 1001 which has RAID group identification information 10011 matching the RAID group 12 under investigation.

Thereupon, the processor of the storage controller 190 judges whether or not the RAID group 12 detected at step s115 exists, and if it does not exist (No at step s116), then the processor transits to step s120.

If, on the other hand, the RAID group 12 detected at step s115 does exist (Yes at step s116), then the processor of the storage controller 190 creates a logical storage extent 11 of the same capacity as the logical storage extent (1), inside the detected RAID group 12, and adds a new entry, accordingly, to the storage extent configuration information 1002 (step s117). Below, a logical storage extent 11 created at step s117 in the erased status storage extent creation process is described as a logical storage extent (3), for descriptive purposes.

Thereupon, the processor of the storage controller 190 erases the data of the created logical storage extent (3) in accordance with the data erasure program 1009 (step s118). When data erasure has been completed, the processor of the storage controller 190 updates the erasure status information 10028 of the entry corresponding to the logical storage extent (3) in the storage extent configuration information 1002, to "Erased" (step s119). The processor of the storage controller 190 also updates the read access permission information 10026 and the write access permission 10027 of the entry corresponding to the logical storage extent (3) in the storage extent configuration information 1002, to "Readable" and "Writable", respectively, in accordance with the storage information security management program 1008 (step s119). Thereupon, the processor transits to step s120, and if the processing described above has not been executed for all of the storage units 10 recorded in the logical unit configuration information 1003, then the processor executes the processing from step sill for another storage unit 10, whereas if the processing described above has been executed for all of the storage units 10, then the processor of the storage controller 190 terminates the erased status storage extent creation process.

Next, a data erasure process for erasing data of a logical volume 10 of the storage subsystem 100, from the host computer 300 or the management computer 500, will be described.

FIG. 16, FIG. 17, FIG. 18 and FIG. 19 are flowcharts of a data erasure process according to one embodiment of the present invention.

The data of the logical storage extents 11 in the storage subsystem 100 can be erased via the host computer 300 or the management computer 500. When erasing data via the host computer 300, the processor unit 380 of the host computer 300 operates in accordance with the data erasure program 3002, the processor unit 380 receives an instruction generated by executing the application program, or receives an instruction from a data administrator using the input interface 370, and it determines the host computer storage volume 16 that is the object of erasure (step s201). The processor unit 380 searches the host computer storage extent configuration information 3001, acquires the record where the identification information stored as the storage volume identification information 30011 coincides with the identification information of the determined host computer storage volume 16, and sends a data erasure request message which states the data I/O interface 140 and the storage unit 10 recorded in the corresponding record, as the erasure object, to the storage subsystem 100 via the data I/O interface 340 (step s202).

On the other hand, when erasing data via the management computer 500, the processor unit 580 of the management computer 500 operates in accordance with the data erasure program 5002, the processor unit 580 receives an instruction generated by executing the application program, or receives an instruction from a data administrator using the input interface 570, and it determines the storage unit 10 or logical storage extent 11 that is the object of erasure (step s201). The processor unit 580 then sends a data erasure request message, stating the storage unit 10 or the logical storage extent 11 thus determined as the erasure object, to the storage subsystem 100, by means of the management interface 550 (step s202).

The storage controller 190 of the storage subsystem 100 receives a data erasure request message sent by the host computer 300 or the management computer 500, via the data I/O interface 140 or the management interface 150, and in accordance with the storage extent configuration management program 1007, the processor of the storage controller 190 searches the logical unit configuration information 1003 for an entry corresponding to the storage unit 10 forming the erasure object contained in the data erasure request message, and acquires the identification information of the logical storage extent 11 stored in the storage extent identification information 10033 of the corresponding entry (step s203). Below, a logical storage extent corresponding to identification information acquired at step s203 in the data erasure process is described as a logical storage extent (1), for descriptive purposes.

In order to judge whether or not data can be erased from the logical storage extent (1), in other words, if data can be written to the logical storage extent (1), in accordance with the storage extent configuration management program 1007, the storage controller 190 of the storage subsystem 100 judges whether or not the write access permission information 10027 of the record corresponding to the logical storage extent (1) in the storage extent configuration information 1002 has the value "Writable" (step s204). If, as a result of step s204, it is judged that writing is not permitted to the logical storage extent (1) forming the erasure object (No at step s204), then this means that data erasure is not possible, and therefore the storage controller 190 replies with an error message to the transmission source of the data erasure request message (namely, the host computer 300 or the management computer 500) (step s205).

If, on the other hand, it is judged that writing is permitted to the logical storage extent (1) forming the erasure object (Yes at step s204), then the processor transits to step s206. The processor of the storage controller 190 refers to the storage extent configuration information 1002, searches the capacity information 10025 of each of the records, and acquires the logical storage extents 11 which have the same capacity as the logical storage extent (1) forming the erasure object. Of the logical storage extents 11 thus acquired, the processor then acquires those logical storage extents 11 in which the write access permission information 10027 of the corresponding record matches "Writable" and the erasure status information 10028 matches "Erased" (step s206). Below, a logical storage extent 11 acquired at step s206 is described as a logical storage extent (2), for descriptive purposes.

If there is one or more logical storage extent (2) matching the search conditions of the step s206 (Yes at step s207), then the processor transits to step s208. If there is no logical storage extent (2) matching the search conditions of the step s206 (No at step s207), then the processor transits to step s213.

At step s208, in order to prohibit read access to the logical storage extent (1) forming the erasure object, the processor of the storage controller 190 changes the read access permission information 10026 of the record corresponding to the logical storage extent (1) in the storage extent configuration information 1002, to "Prohibited" (step s208). By this means, the processor of the storage controller 190 prohibits read requests from an external apparatus (for example, a host computer) to the logical storage extent (1), by operating in accordance with the storage extent security management program 1008. Consequently, it is possible to achieve suitable prevention of leaking of the data in the corresponding logical storage extent 11.

Thereupon, the processor of the storage controller 190 changes the erasure status information 10028 of the record corresponding to one logical storage extent 11 of the logical storage extents (2), in the storage extent configuration information 1002, to the value "Not Erased", which indicates that data erasure has not been carried out (a non-erased status) (step s209). Thereupon, the processor of the storage controller 190 changes the logical storage extent 11 constituting the storage unit 10 forming the erasure object, from the logical storage extent (1) to one logical storage extent 11 of the logical storage extents (2) which have been erased (step s210). In other words, the processor of the storage controller 190 updates the storage extent identification information 10033 of the record corresponding to the storage unit 10 forming the erasure object in the logical unit configuration information 1003, to the identification information of one of the logical storage extents (2).

Thereupon, the processor of the storage controller 190 sends a message which indicates the normal completion of processing in relation to erasure of data (normal completion notification), to the transmission source of the data erasure request message (host computer 300 or management computer 500), in accordance with the storage extent configuration management program 1007 (step s211). This message which indicates normal completion shows that access to the storage unit 10 forming the data erasure object has become possible, and upon receiving this message indicating normal completion, the host computer 300 or the management computer 500 recognizes that data erasure has been completed in the storage unit 10 forming the erasure object, and that an access process for writing, reading, or the like, can be executed with respect to the storage unit 10 forming the erasure object. Consequently, the host computer 300, or the like, becomes able to access the storage unit 10, without waiting for the completion of actual data erasure in the logical storage extent 11 associated with the storage unit 10, and therefore it is possible effectively to reduce the waiting time for access to a storage unit 10 from a host computer 300, or the like.

Thereupon, the processor of the storage controller 190 erases the data of the logical storage extent (1) forming the erasure object (step s212), by executing the data erasure program 1009 in accordance with the storage extent configuration management program 1007, and then transits to step s215. The method for erasing data is, for example, a method where prescribed dummy data is written a plurality of times (for example, three times) to the physical storage extent of the storage apparatus 120 which corresponds to the logical storage extent (1).

If, on the other hand, it is judged as a result of step s207 that there is no logical storage extent (2) which satisfies the search criteria in step s206 (No at step s207), then this means that there does not exist any logical storage extent 11 having an erased status which can be exchanged with the logical storage extent (1), and hence the processor transits to step s213.

The processor of the storage controller 190 erases the data of the logical storage extent (1) forming the erasure object, by executing the data erasure program 1009 in accordance with the storage extent configuration management program 1007 (step s213). After erasing the data of the logical storage extent (1), the processor of the storage controller 190 sends a message which indicates the normal completion of processing relating to data erasure, to the transmission source of the data erasure request message (host computer 300 or management computer 500) (step s214), and then transits to the step s215.

At step s215, when step s212 or step s214 has completed, the logical storage extent (1) forming the erasure object assumes an erased status, and therefore the processor of the storage controller 190 changes the erasure status information 10028 of the record corresponding to the logical storage extent (1) in the storage extent configuration information 1002, to "Erased", in accordance with the storage extent configuration management program 1007 (step s215), and changes the corresponding read access permission information 10026 to "Readable", thereby permitting read access to the logical storage extent (1) (step s216). By this means, it is possible to use the logical storage extent (1) in exchange with a logical storage extent 11 forming a new erasure object.

Thereupon, the processor of the storage controller 190 sends a completion notification message which indicates completion of the series of data erasure processing, to the management computer 500 (step s217). The completion notification message contains information required for creation of an erasure certification, such as the identification information of the logical storage extent (1) forming the erasure object, the erasure completion time, the data erasure algorithm used to erase data, the number of overwrites of dummy data, and the like.

The processor unit 580 of the management computer 500 receives the completion notification message via the management interface 550, and creates an erasure certification including the identification information of the logical storage extent (1) forming the erasure object, the erasure completion time, the data erasure algorithm used to erase data, the number of overwrites of the dummy data, or the like, on the basis of the information contained in the management notification message (step s218), and the processor unit 580 outputs the erasure certification via the output interface 575 in accordance with the erasure certification output program 5003 (step s219). By this means, an administrator is able to ascertain appropriately that erasure of the logical storage extent 11 has been carried out reliably, and is able to certify to a third party that the logical storage extent 11 has been shredded.

Next, the data erasure process shown in FIG. 16 to FIG. 19 is described by means of a more specific example. Reference is made to FIG. 16 to FIG. 19, as appropriate.

Firstly, the statuses of the host computer 300 and the storage subsystem 100 are the statuses shown in FIG. 12, and an example is described below in which the user of the host computer 300 or the processor unit 380 executing the application of the host computer 300 has designated the storage volume 16 indicated by "/data2", as an erasure object.

The processor unit 380 of the host computer 300 determines the designated storage volume 16 indicated by "/data2", as an erasure object (step s201), and it sends a data erasure request message relating to the storage unit 10 indicated as "LU-12" on the data I/O interface 140a indicated by the identification information "50:00:01:1E:0A:E8:02", which is the storage unit 10 that constitutes the storage volume 16 indicated as "/data2", to the corresponding data I/O interface 140a (step s202).

In the storage subsystem 100, upon receiving the data erasure request message, the processor of the storage controller 190 searches for the record corresponding to the identification information "50:00:01:1E:0A:E8:02" of the data I/O interface 140a and the identification information "LU-12" of the storage unit, in the logical unit configuration information 1003, and it judges that the identification information of the logical storage extent 11 constituting the storage unit 10 forming the erasure object is "LD-03", from the storage extent identification information 10033 of the corresponding record. Thereupon, the processor of the storage controller 190 identifies the record corresponding to the logical storage extent 11 indicated as "LD-03", from the storage extent configuration information 1002, refers to the write access permission information 10027 of the corresponding record, and judges that write access is permitted to the logical storage extent 11 indicated as "LD-03" (step s204).

Since write access is permitted, the processor of the storage controller 190 searches the storage extent configuration information 1002 to find a logical storage extent 11 which has the same capacity as the logical storage extent 11 indicated as "LD-03" (a capacity of 100 GB), to which write access is permitted, and which has an erased status, and it ascertains that the logical storage extent 11 indicated as "LD-02" satisfies these conditions (steps s206, s207). Thereupon, the processor of the storage controller 190 changes the read access permission information 10026 of the record corresponding to the logical storage extent 11 indicated as "LD-03" in the storage extent configuration information 1002, to "Prohibited", thereby prohibiting read access to the logical storage extent 11 indicated as "LD-03" (step s208). Thereby, read access to the logical storage extent 11 indicated as "LD-03" becomes impossible, and therefore leaking of data from this logical storage extent 11 can be prevented.

Thereupon, the processor of the storage controller 190 changes the erasure status information 10028 of the record corresponding to the logical storage extent 11 indicated as "LD-02" in the storage extent configuration information 1002, to "Not Erased" (step s209). The processor of the storage controller 190 then changes the storage extent identification information 10033 of the records in the logical unit configuration information 1003 which correspond to the storage unit 10 indicated as "LU-12" on the data I/O interface 140a indicated as "50:00:01:1E:0A:E8:02", to "LD-02" (step s210). By this means, the logical storage extent 11 indicated as "LD-02" is associated with the storage unit 10 indicated as "LU-12" on the data I/O interface 140a indicated as "50:00:01:1E:0A:E8:02". Thereupon, the processor of the storage controller 190 sends a normal terminal notification in reply to the host computer 300 (step s211). Upon receiving this normal completion notification, the host computer 300 is able to restart I/O processing with respect to the storage unit 10.

Thereupon, the processor of the storage controller 190 executes data erasure in the logical storage extent 11 indicated as "LD-03" (step s212). When data erasure has been completed, the processor of the storage controller 190 changes the erasure status information 10028 in the record of the storage extent configuration information 1002 which corresponds to the logical storage extent 11 indicated as "LD-03", to "Erased" (step s215), and furthermore, it changes the corresponding read access permission information 10026 back to "Readable" (step s216). By this means, the logical storage extent 11 indicated as "LD-03" can be used as a logical storage extent 11 for exchange, in subsequent processing. Thereupon, the processor of the storage controller 190 sends an erasure completion notification to the management computer 500 (step s217).

The processor unit 580 of the management computer 500 creates an erasure certification (step s218), and outputs this erasure certification from the output interface 575 (step s219).

There follows a description of the storage subsystem 100 after executing the data erasure process described in the concrete example given above.

Figure 20:
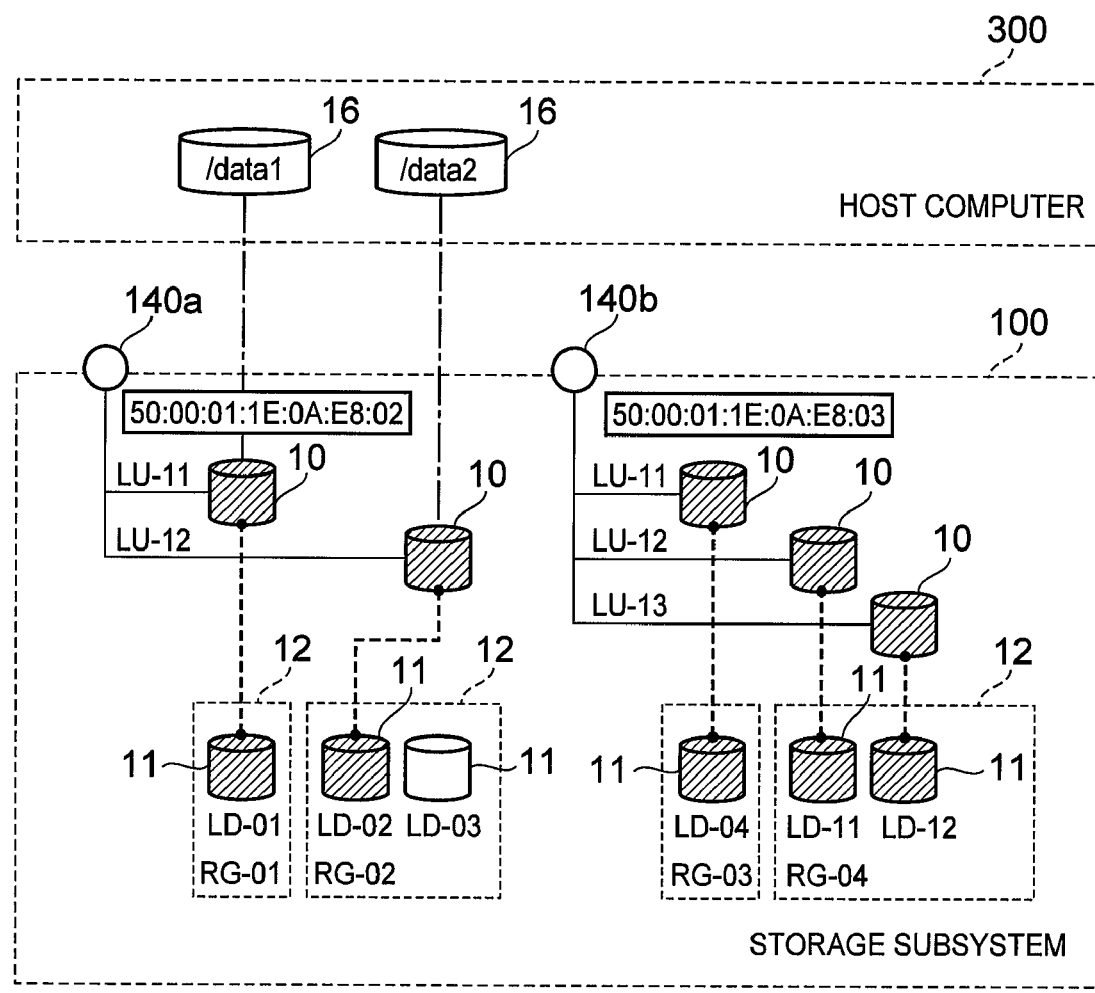
FIG. 20 is a diagram showing one example the logical structure of a storage system after executing the processing according to one embodiment of the present invention.

FIG. 20 is a diagram showing one example a portion of the logical structure of a storage subsystem after executing the processing according to one embodiment of the present invention.

Before the processing, as shown in FIG. 12, the logical storage extent 11 indicated as "LD-03" was associated with the storage unit 10 indicated as "LU-12" on the data I/O interface 140a indicated as "50:00:01:1E:0A:E8:02", but by executing the data erasure process described above, as shown in FIG. 20, the logical storage extent 11 indicated as "LD-02" is associated with the storage unit 10 indicated as "LU-12" on the data I/O interface 140a indicated as "50:00:01:1E:0A:E8:02", and the logical storage extent 11 indicated as "LD-02" becomes mounted on the host computer 300 as "/data2".

FIG. 21 is a diagram showing one example of the structure of logical unit configuration information after executing processing according to one embodiment of the present invention.

Before the processing, as shown in FIG. 7, in the logical unit configuration information 1003, the logical storage extent 11 indicated as "LD-03" was associated with the storage unit 10 indicated as "LU-12" on the data I/O interface 140a indicated as "50:00:01:1E:0A:E8:02", but upon executing the data erasure process described above, as shown in FIG. 21, the logical storage extent 11 indicated as "LD-02" is associated with the storage unit 10 indicated as "LU-12" on the data I/O interface 140a indicated as "50:00:01:1E:0A:E8:02".

FIG. 22 is a diagram showing one example of the structure of storage extent configuration information after executing processing according to one embodiment of the present invention.

Before processing, as shown in FIG. 6, in the storage extent configuration information 1002, the value "Erased" was stored in the erasure status information 10028 corresponding to the logical storage extent 11 indicated as "LD-02" and the value "Not Erased" was stored in the erasure status information 10028 corresponding to the logical storage extent 11 indicated as "LD-03", but after the data erasure process, as shown in FIG. 22, the value "Not Erased" is stored in the erasure status information 10028 corresponding to the logical storage extent 11 indicated as "LD-02" and the value "Erased" is stored in the erasure status information 10028 corresponding to the logical storage extent 11 indicated as "LD-03". In other words, the situations of the logical storage extent 11 indicated as "LD-02" and the logical storage extent 11 indicated as "LD-03" are reversed.

Next, a data erasure process for erasing the data of a virtual storage unit (virtual volume) 13 of the storage subsystem 100, from the host computer 300 or the management computer 500, will be described.

When erasing data from a virtual storage unit 13, if it is sought to execute data erasure by means of the same method as a logical unit 10, then this means writing dummy data onto the whole extent of the virtual storage unit 13, and hence a logical storage extent 11 is allocated to the whole extent of the virtual address space of the virtual storage unit 13 and there is a risk that the storage resources of the virtual storage resource pool 14 will be insufficient.

Therefore, in the present embodiment, the following data erasure process is executed when erasing data from a virtual storage unit 13.

FIG. 23 and FIG. 24 are flowcharts of a data erasure process for a virtual storage unit according to one embodiment of the present invention.

The data of the virtual storage units 13 in the storage subsystem 100 can be erased via the host computer 300 or the management computer 500. When erasing data via the host computer 300, the processor unit 380 of the host computer 300 operates in accordance with the data erasure program 3002, the processor unit 380 receives an instruction generated by executing the application program, or receives an instruction from a data administrator using the input interface 370, and it determines the host computer storage volume 16 that is the object of erasure (step s301). The processor unit 380 searches the host computer storage extent configuration information 3001, acquires the record where the identification information stored as the storage volume identification information 30011 coincides with the identification information of the determined storage volume 16 of the host computer, and sends a data erasure request message which states the data I/O interface 140 and the virtual storage unit 13 recorded in the corresponding record, as the erasure object, to the storage subsystem 100 via the data I/O interface 340 (step s302).

On the other hand, when erasing data via the management computer 500, the processor unit 580 of the management computer 500 operates in accordance with the data erasure program 5001, the processor unit 580 receives an instruction generated by executing the application program, or receives an instruction from a data administrator using the input interface 570, and it determines the virtual storage unit 13 or logical storage extent 11 that is the object of erasure (step s301). The processor unit 580 then sends a data erasure request message, stating the virtual storage unit 13 or the logical storage extent 11 thus determined as the erasure object, to the storage subsystem 100, by means of the management interface 550 (step s302).

The storage controller 190 of the storage subsystem 100 receives a data erasure request message sent by the host computer 300 or the management computer 500, via the data I/O interface 140 or the management interface 150, and the processor of the storage controller 190 searches the virtual storage extent configuration information 1005 for an entry corresponding to the virtual storage unit 13 forming the erasure object contained in the data erasure request message, in accordance with the virtual storage unit management program 1010, and acquires the identification information of the virtual storage extent stored in the virtual storage extent identification information 10054 of the corresponding entry (step s303). Below, a virtual storage extent 15 corresponding to identification information acquired at step s303 in the data erasure process is described as a virtual storage extent (1), for descriptive purposes.

The processor of the storage controller 190 searches the virtual storage extent allocation map information 1006 and acquires all of the entries storing identification information which indicate the virtual storage extent (1) as the virtual storage extent identification information 10067. The processor then saves copies of the entries thus acquired, as allocation map information, in a temporary storage extent in the program memory 1000, for example (step s304).

In accordance with the virtual storage unit management program 1010, the processor of the storage controller 190 searches the virtual storage extent allocation map information 1006 for all entries which have identification information indicating the virtual storage extent (1) stored as the virtual storage extent identification information 10067, and by changing the allocation permission status information 10063 to "Prohibited" in the entries obtained as a result of the this search, it sets the storage extent of the logical storage extent 11 that was allocated to the virtual storage extent (1) in question, to an allocation prohibited status (step s305). Moreover, the processor of the storage controller 190 releases the virtual storage extent (1) by clearing all of the virtual storage extent information 10062 in the entries obtained as a result of the search, to a Null value, and it also releases the logical storage extents which were allocated to the virtual storage extent (1) in question (step s306). By this means, it becomes possible to allocate the virtual storage extent (1). The processor of the storage controller 190 sends a normal completion notification to the source of the data erasure request (the host computer 300 or the management computer 500), in accordance with the virtual storage unit management program 1010 (step s307). This message which indicates normal completion shows that access to the virtual storage unit 13 forming the erasure object has become possible, and upon receiving the message which indicates this normal completion, the host computer 300 or the management computer 500 recognizes that data erasure has been completed in the virtual storage unit 13 of the erasure object, and that an access process for writing, reading, or the like, can be executed with respect to the virtual storage unit 13 forming the data erasure object. Consequently, the host computer 300, or the like, becomes able to access the virtual storage unit 13 in question, without waiting for the completion of actual data erasure in the logical storage extent 11 corresponding to the virtual storage unit 13, and therefore it is possible effectively to reduce the waiting time for access to a storage unit 13 from a host computer 300, or the like.

The processor of the storage controller 190 then executes data erasure in accordance with the data erasure program 1009, with respect to the storage extent of the address range (address space) specified by the initiation block address 10065 and the termination block address 10066 in the logical storage extent 11 which is indicated by the identification information stored as the logical storage extent identification information 10064 in the logical storage extent information 10061 contained in the copied allocation map information (step s308). After completing data erasure, in accordance with the virtual storage unit management program 1010, the processor of the storage controller 190 changes the allocation permission status information 10063 to "Permitted" in each of the entries that were set to an allocation prohibited status at step s305, thereby setting the storage extent of the corresponding address range of the corresponding logical storage extent 11 to a status which allows allocation to a virtual storage extent 15 (step s309). By this means, the storage extent of the logical storage extent 11 that was temporarily prohibited for allocation becomes allocatable to a virtual storage extent 15.

Thereupon, the processor of the storage controller 190 sends an erasure completion notification to the management computer 500 (step s310), in accordance with the virtual storage unit management program 1010, and deletes the allocation map information saved at step s304 from the temporary storage extent (step s311). The processor unit 580 of the management computer 500 receives the completion notification message via the management interface 550, and on the basis of the information contained in the management notification message, the processor unit 580 creates an erasure certification (step s312), and outputs this erasure certification via the output interface 575, in accordance with the erasure certification output program 5003 (step s219). By this means, an administrator is able to ascertain appropriately that erasure of the data managed in the virtual storage unit 13 has been carried out reliably, as well as being able to certify to a third party that the storage extent has been shredded.

Next, the data erasure process shown in FIG. 23 and FIG. 24 is described by means of a more specific example. Reference is made to FIG. 23 and FIG. 24, as appropriate.

Firstly, the statuses of the host computer 300 and the storage subsystem 100 are as shown in FIG. 12, and a user who is operating the host computer 300 or the processor unit 380 which is executing an application in the host computer 300, sends a data erasure request message relating to the storage unit 13 indicated as "LU-21" on the data I/O interface 140a indicated by the identification information "50:00:01:1E:0A:E8:02", which is a virtual storage unit 13, to the data I/O interface 140a (step s302).

In the storage subsystem 100, upon receiving the data erasure request message, the processor of the storage controller 190 searches for the record corresponding to the identification information "50:00:01:1E:0A:E8:02" of the data I/O interface 140a and the identification information "LU-21" of the storage unit, in the virtual storage unit configuration information 1005, and it judges that the identification information of the virtual storage extent 15 constituting the virtual storage unit 13 forming the erasure object is "VD-01", from the virtual storage extent identification information 10054 of the corresponding record.

Thereupon, the processor of the storage controller 190 searches the virtual storage extent allocation map information 1006 and acquires all of the entries which have "VD-01" stored as the virtual storage extent identification information 10067. The processor then saves copies of the entries thus acquired (the entries in the second and fifth lines in FIG. 10), as allocation map information, in a temporary storage extent in the program memory 1000, for example (step s304).

In accordance with the virtual storage unit management program 1010, the processor of the storage controller 190 searches the virtual storage extent allocation map information 1006 for all of the entries which have "VD-01" stored as the virtual storage extent identification information 10067, and it changes the allocation permission status information 10063 to "Prohibited" in each of the entries acquired as a result of this search (the entries in the second and fifth lines in FIG. 10) (step s305). Moreover, the processor of the storage controller 190 changes all of the virtual storage extent information 10062 in the entries obtained by the search, to Null (step s306). The processor of the storage controller 190 sends a normal completion notification to the source of the data erasure request (the host computer 300), in accordance with the virtual storage unit management program 1010 (step s307). Upon receiving this normal completion notification, the host computer 300 recognizes that data erasure of the virtual storage unit 13 forming the erasure object has been completed, and it becomes able to execute a write or read access process with respect to the virtual storage unit 13 indicated as "LU-21" on the data I/O interface 140a indicated by the identification information "50:00:01:1E:0A:E8:02", which formed the data erasure object. Consequently, the host computer 300 becomes able to access the virtual storage unit 13 in question, without waiting for the completion of actual data erasure with respect to the logical storage extent 11 corresponding to the virtual storage unit 13, and therefore it is possible effectively to reduce the waiting time for access to a virtual storage unit 13 from a host computer 300.

Thereupon, in accordance with the data erasure program 1009, the processor of the storage controller 190 executes data erasure with respect to the storage extent of the address range "0x0011" to "0x0020" specified by the initiation block address 10065 and the termination block address 10066 in the logical storage extent 11 indicated as "LD-21", which was stored as the logical storage extent identification information 10064 in the logical storage extent information 10061 of the copied allocation map information, and with respect to the storage extent of the address range "0x0041" to "0x0050"

specified by the initiation block address 10065 and the termination block address 10066 in the logical storage extent 11 indicated as "LD-22" (step s308). After completing data erasure, in accordance with the virtual storage unit management program 1010, the processor of the storage controller 190 changes the allocation permission status information 10063 to "Permitted" in each of the entries of the virtual storage extent allocation map information 1006 that were set to an allocation prohibited status at step s305 (step s309). By this means, the storage extent in the logical storage extent 11 that was allocated to the virtual storage unit 13 forming the erasure object can be allocated newly to a virtual storage extent 15, from then onwards.

FIG. 25 is a diagram showing one example of the structure of virtual storage extent allocation map information after executing processing according to one embodiment of the present invention.

Before the process, as shown in FIG. 10, in the virtual storage extent allocation map information 1006, the address space "0x0011 to 0x0020" of the logical storage extent 11 indicated as "LD-21" is associated with the virtual address space "0x0001 to 0x0010" of the virtual storage extent 15 indicated as "VD-01", and the address space "0x0001 to 0x0010" of the logical storage extent 11 indicated as "LD-22" is associated with the virtual address space "0x0041 to 0x0050" of the virtual storage extent 15 indicated as "VD-01".

On the other hand, after the data erasure process, as shown in FIG. 25, information in which all of the information relating to the virtual storage extent 15 indicated by "VD-01" has been changed to Null, is associated with the address space "0x0011 to 0x0020" of the logical storage extent 11 indicated as "LD-21" and the address space "0x0001 to 0x0010" of the logical storage extent 11 indicated as "LD-22", which were associated with the virtual storage extent 15 indicated as "VD-01". In other words, the storage extent allocated to the virtual storage unit 15 that is indicated as "LU-21" at the data I/O interface 140a indicated as "50:00:01:1E:0A:E8:02" no longer exists. This state is one where the actual data that was written to the virtual storage unit 15 in question does not exist.

The present invention was described on the basis of an embodiment above, but the present invention is not limited to the embodiment described above and it may also be applied in various other modes.

For example, in the embodiment described above, hard disk drives were used as the storage apparatuses 120 of the storage subsystem 100, but the present invention is not limited to this, and it is also possible to exchange all, or at least a portion, of the storage apparatuses 120 with any other storage apparatus which is capable of storing data, such as flash memory, for example.

Furthermore, in the embodiment described above, the address space of the logical storage extent 11 allocated to a virtual storage extent 15 forming an erasure object is temporarily prohibited from allocation to the virtual storage extent 15, and after the data of the address space in the corresponding logical storage extent 11 has been erased, then allocation is enabled again, but the present invention is not limited to this, and it is possible, for example, to remove the address space of the logical storage extent 11 allocated to the virtual storage extent 15 forming the erasure object, from the virtual storage resource pool 14, and to incorporate the address space of another, different logical storage extent 11, into the virtual storage resource pool 14, in such a manner that the data in the address space of the logical storage extent 11 allocated to the virtual storage extent 15 forming the erasure object can subsequently be erased. By adopting a composition of this kind, it is possible to prevent temporary reduction in the storage capacity of the logical storage extent 11 which can be allocated to the virtual storage extent 15.

Furthermore, the embodiment described above related to an example where the erasure certification is output to a display, but the present invention is not limited to this, and it is also possible to output the certification to a paper medium, for example.

What is claimed is:

1. A storage system for managing volumes to which storage extents of at least a portion of a plurality of magnetic disk storage apparatuses are allocated, comprising:
    a request reception unit which receives an erasure process request to erase data stored in a first storage extent allocated to a volume;
    a storage extent detection unit which detects as a second storage extent, a storage extent in which data erasure has been carried out in advance,
    wherein the data erasure includes writing dummy data to the entire second storage extent, and
    wherein the second storage extent is different from the first storage extent allocated to the volume;
    an allocation unit which allocates the second storage extent to the volume, in place of the first storage extent;
    a notification transmission unit, which after allocation of the second storage extent to the volume, sends a notification to a source of the erasure process request, the notification indicating that access to the volume is possible; and
    a first data erasure unit, which after the notification indicating that access to the volume is possible has been sent, erases the data stored in the first storage extent.

2. The storage system according to claim 1, wherein the storage extent detection unit detects, as the second storage extent, a storage extent having a capacity equal to or greater than the capacity of the first storage extent.

3. The storage system according to claim 1, further comprising a second data erasure unit which erases data of a storage extent which could become the second storage extent and which could be allocated to the volume.

4. The storage system according to claim 1, further comprising an access blocking unit which blocks access to the first storage extent, until at least the erasure of the data in the first storage extent has been completed.

5. The storage system according to claim 1, further comprising a data erasure notification unit which sends a notification indicating that data erasure has been completed, after the first data erasure unit completes the erasure of the data in the first storage extent.

6. The storage system according to claim 1, further comprising an erasure notification control unit, whereby, when the storage extent detection unit is not able to detect a second storage extent which can be allocated to the volume, then the data in the first storage extent is erased by the first data erasure unit, and after the first data erasure unit completes erasure of the data in the first storage extent, the notification indicating that access to the volume is possible is sent by the notification transmission unit to the source of the erasure process request.

7. The storage system according to claim 1, wherein a storage extent having a prescribed storage capacity of at least a portion of the plurality of magnetic disk storage apparatuses is allocated statically to the volume.

8. A storage system for managing virtual volumes to which storage extents of at least a portion of a plurality of magnetic disk storage apparatuses can be allocated dynamically, comprising:

an allocation storage unit which stores information regarding a virtual storage extent,
wherein the virtual storage extent is allocated to data stored in a virtual volume;
a request reception unit which receives an erasure process request to erase the data stored in the virtual volume;
a virtual storage extent release unit which releases the virtual storage extent allocated to the data in the virtual volume, for allocation to other data, when the erasure process request is received;
a notification transmission unit, which after release of the virtual storage extent, sends a notification to a source of the erasure process request, the notification indicating that access to the virtual volume is possible;
a data erasure unit, which erases the data in the storage extent allocated to the virtual volume,
wherein the allocation storage unit associates and stores information indicating the storage extent allocated to the data of the virtual volume, and information indicating the virtual storage extent on the virtual volume allocated to the data of the virtual volume;
a storage extent acquisition unit which acquires, from the allocation storage unit, the information indicating the storage extent allocated to the data of the virtual volume; and
an acquired information storage unit which stores the information indicating the storage extent thus acquired,
wherein the virtual storage extent release unit releases the virtual storage extent allocated to the data in the virtual volume, for allocation to other data, by deleting, from the allocation storage unit, the information indicating the virtual storage extent on the virtual volume allocated to the data of the virtual volume, and
wherein the data erasure unit executes erasure of data in the storage extent allocated to the data of the virtual volume, based on the information indicating the storage extent stored in the acquired information storage unit.

9. The storage system according to claim 8, further comprising an allocation blocking unit which blocks allocation of the storage extent to the virtual volume, at least until the erasure of the data of the storage extent has been completed.

10. The storage system according to claim 8, further comprising a data erasure notification unit which sends a notification indicating that data erasure has been completed, after the data erasure unit completes the erasure of data in the storage extent.

11. A volume data erasure method for a storage system for managing volumes to which storage extents of at least a portion of a plurality of magnetic disk storage apparatuses are allocated, the method comprising the steps of:
receiving an erasure process request to erase data stored in a first storage extent allocated to a volume;
detecting as a second storage extent, a storage extent in which data erasure has been carried out in advance,
wherein the data erasure includes writing dummy data to the entire second storage extent, and
wherein the second storage extent is different from the first storage extent allocated to the volume;
allocating the second storage extent to the volume, in place of the first storage extent;
after allocation of the second storage extent to the volume, sending a notification to a source of the erasure process request, the notification indicating that access to the volume is possible; and
after the notification indicating that access to the volume is possible has been sent, erasing the data store in the first storage extent.

12. A computer system comprising:
a storage system for managing volumes to which storage extents of at least a portion of a plurality of magnetic disk storage apparatuses are allocated;
a host computer; and
a management computer,
wherein the storage system comprises:
a request reception unit which receives an erasure process request to erase data stored in a first storage extent allocated to a volume;
a storage extent detection unit which detects as a second storage extent, a storage extent in which data erasure has been carried out in advance,
wherein the data erasure includes writing dummy data to the entire second storage extent, and
wherein the second storage extent is different from the first storage extent allocated to the volume;
an allocation unit which allocates the second storage extent to the volume, in place of the first storage extent;
a notification transmission unit, which after allocation of the second storage extent to the volume, sends a notification to a source of the erasure process request, the notification indicating that access to the volume is possible; and
a first data erasure unit, which after the notification indicating that access to the volume is possible has been sent, erases the data stored in the first storage extent, and
wherein the host computer or the management computer comprises:
a request transmission unit which sends the erasure process request for the data stored in the volume, to the storage system; and
a notification reception unit which receives the notification indicating that access to the volume is possible.

13. A computer system comprising:
a storage system for managing volumes to which storage extents of at least a portion of a plurality of magnetic disk storage apparatuses are allocated;
a host computer; and
a management computer,
wherein the storage system comprises:
a first interface connected to the host computer and the management computer;
a first processor connected to the first interface; and
a first storage extent which stores data, and which is allocated to a volume,
wherein the first processor:
receives, from the host computer, via the first interface, an erasure process request to erase the data stored in the first storage extent allocated to the volume,
detects, as a second storage extent, a storage extent in which data erasure has been carried out in advance,
wherein the data erasure includes writing dummy data to the entire second storage extent, and
wherein the second storage extent is different from the first storage extent allocated to the volume,
allocates the second storage extent to the volume, in place of the first storage extent,
after allocation of the second storage extent to the volume, sends a notification to the host computer that is a source of the erasure process request, via the first interface, the notification indicating that access to the volume is possible,
after the notification indicating that access to the volume is possible has been sent, erases the data stored in the first storage extent, and after the erasure of the data in the first storage extent, sends to the management computer, via the first interface, a notification indicating that erasure of the data of the volume has been completed, wherein the host computer comprises a second interface connected to the storage system and a second processor connected to the second interface, and wherein the second processor:

sends the erasure process request relating to data stored in the volume, to the storage system, via the second interface, and receives the notification indicating that access to the volume is possible, from the storage system, via the second interface, wherein the management computer comprises a third interface connected to the storage system, a third processor connected to the third interface, and an output interface connected to the third processor, and wherein the third processor:

receives, from the storage system, via the third interface, the notification indicating that erasure of the data stored in the first storage extent allocated to the volume has been completed, and outputs, by the output interface, a data erasure certification indicating that erasure of the data stored in the first storage extent allocated to the volume has been completed.

* * * * *